(12) United States Patent
Namiki

(10) Patent No.: US 7,286,212 B2
(45) Date of Patent: Oct. 23, 2007

(54) APPARATUS AND METHOD FOR MEASURING ECCENTRICITY OF ASPHERICAL SURFACE

(75) Inventor: Mitsuru Namiki, Hanno (JP)

(73) Assignee: Olympus Corporation, Tokyo (JP)

( * ) Notice: Subject to any disclaimer, the term of this patent is extended or adjusted under 35 U.S.C. 154(b) by 332 days.

(21) Appl. No.: 10/979,165

(22) Filed: Nov. 3, 2004

(65) Prior Publication Data

US 2005/0174566 A1    Aug. 11, 2005

(30) Foreign Application Priority Data

Nov. 7, 2003    (JP) .............................. 2003-378409

(51) Int. Cl.
*G01B 9/00*    (2006.01)
(52) U.S. Cl. ...................... 356/127; 356/124
(58) Field of Classification Search ................ 356/124, 356/127
See application file for complete search history.

(56) References Cited

U.S. PATENT DOCUMENTS

| | | | | |
|---|---|---|---|---|
| 3,877,788 A | * | 4/1975 | Sprague et al. ............. | 356/124 |
| 4,767,215 A | * | 8/1988 | Borodovsky ................ | 356/124 |
| 5,210,591 A | * | 5/1993 | DeGroot ...................... | 356/513 |
| 5,253,038 A | * | 10/1993 | Bouwhuis et al. .......... | 356/492 |
| 5,548,396 A | * | 8/1996 | Morita et al. ................ | 356/127 |
| 5,760,889 A | * | 6/1998 | Manning ..................... | 356/124 |
| 5,844,670 A | * | 12/1998 | Morita et al. ................ | 356/124 |
| 6,750,958 B1 | * | 6/2004 | Fantone et al. ............. | 356/124 |
| 6,972,849 B2 | * | 12/2005 | Kuchel ........................ | 356/513 |
| 7,046,351 B2 | * | 5/2006 | Ito .............................. | 356/127 |
| 2003/0002048 A1 | * | 1/2003 | Zanoni ....................... | 356/512 |

FOREIGN PATENT DOCUMENTS

| | | |
|---|---|---|
| JP | 06-021630 | 8/1995 |
| JP | 06-301236 | 6/1996 |

* cited by examiner

*Primary Examiner*—Gregory J. Toatley, Jr.
*Assistant Examiner*—Bryan J Giglio
(74) *Attorney, Agent, or Firm*—Kenyon & Kenyon LLP

(57) ABSTRACT

An apparatus for measuring the eccentricity of the aspherical surface has a light source unit; a condenser lens condensing light rays in the proximity of the center of paraxial curvature of a surface to be examined, of an aspherical lens; an angle changing means for entering the rays on the surface to be examined, at angles $\theta 1i$ ($i=1, 2, \ldots, N$) with an optical axis; a holding tool of the aspherical lens; a light-splitting element; an imaging lens; a light-detecting element detecting the situation of light collected by the imaging lens; and an arithmetical unit. The arithmetical unit is such as to calculate the amount of eccentricity of the surface to be examined, from amounts of shift $\Delta P1i$ ($i=1, 2, \ldots, N$) between spot positions $P1i$ ($i=1, 2, \ldots, N$) based on the design data of the surface to be examined and spot positions $P1mi$ ($i=1, 2, \ldots, N$) derived from the light-detecting element, with respect to light rays $Q1i$ ($i=1, 2, \ldots, N$) produced by the angle changing means.

16 Claims, 15 Drawing Sheets

APPARATUS AND METHOD FOR MEASURING ECCENTRICITY OF ASPHERICAL SURFACE

This application claims priority to Japanese Patent Application No. 2003-378409 filed 07 Nov. 2003, the content of which is incorporated herein by reference in its entirety.

BACKGROUND OF THE INVENTION

1. Field of the Invention

This invention relates to an apparatus for measuring the eccentricity of an aspherical surface that facilitates the measurement of the amount of eccentricity of an aspherical lens and a method for measuring the same.

2. Description of Related Art

Optical lenses using aspherical surfaces have come to be widely applied. Since it is very difficult that aspherical lenses are configured by grinding, molding methods using molds are popularized. However, the face-to-face eccentricity of the aspherical lens is caused by an insufficient adjustment of the mold in molding, and the aspherical lens undergoes the degradation of optical performance when optical modules are finally assembled. Consequently, for the purpose not only of improving the optical performance, but also of readjusting the mold in molding, a measuring device measuring the eccentricity of the aspherical lens after molding, is essential.

A conventional apparatus for measuring the eccentricity of the aspherical lens is set forth, for example, in Japanese Patent Kokai No. Hei 07-229811.

In a method for measuring the eccentricity that uses this apparatus, the coordinates of an aspherical surface to be examined, of the aspherical lens are measured at a plurality of places to perform fitting of a measured result to design data of a virtually decentered aspherical surface to be examined so that the eccentricity of the aspherical surface is determined from the amount of eccentricity that a difference between both is minimized.

SUMMARY OF THE INVENTION

The apparatus for measuring the eccentricity of the aspherical surface, according to the present invention, comprises a light source unit; a condenser lens condensing light rays Q1 emitted from the light source unit in the proximity of the center of paraxial curvature of a surface A to be examined, of the aspherical lens; an angle changing means for entering the rays Q1 emitted from the light source unit on the surface A at angles $\theta 1i$ (i=1, 2, ..., N) with an optical axis AX; a holding tool holding the aspherical lens; a light-splitting element interposed between the angle changing means and the holding tool; an imaging lens collecting light reflected by the light-splitting element; a light-detecting element detecting the situation of light collected by the imaging lens; and an arithmetical unit. The arithmetical unit includes the processes of storing spot positions P1mi (i=1, 2, ..., N) derived from the light-detecting element with respect to light rays Q1i (i=1, 2, ..., N) produced by the angle changing means; calculating spot positions P1i (i=1, 2, ..., N) relative to the rays Q1i (i=1, 2, ..., N) on the basis of the design data of the surface A; and calculating the amount of eccentricity of the surface A from amounts of shift $\Delta P1i$ (i=1, 2, ..., N) between the spot positions P1i (i=1, 2, ..., N) and the spot positions P1mi (i=1, 2, ..., N).

The apparatus for measuring the eccentricity of the aspherical surface, according to the present invention, comprises a second light source unit placed on the opposite side of the light source unit in the construction mentioned above, with the holding tool between them; a second condenser lens placed on the optical axis AX, condensing light rays Q2 emitted from the second light source unit in the proximity of the center of paraxial curvature of a surface B to be examined, situated on the opposite side of the surface A; a second angle changing means for rendering the rays Q2 emitted from the second light source unit incident on the surface B at angles $\theta 2i$ (i=1, 2, ..., N) with the optical axis AX; a second light-splitting element interposed between the second angle changing means and the holding tool; a second imaging lens collecting light reflected by the second light-splitting element; and a second light-detecting element detecting the situation of light collected by the second imaging lens. The arithmetical unit includes the processes of storing spot positions P2mi (i=1, 2, ..., N) derived from the second light-detecting element with respect to light rays Q2i (i=1, 2, ..., N) produced by the second angle changing means; calculating spot positions P2i (i=1, 2, ..., N) relative to the rays Q2i (i=1, 2, ..., N) on the basis of the design data of the surface B; calculating the amount of eccentricity of the surface B from amounts of shift $\Delta P2i$ (i=1, 2, ..., N) between the spot positions P2i (i=1, 2, ..., N) and the spot positions P2mi (i=1, 2, ..., N); and calculating the face-to-face eccentricity of the aspherical lens by using the amounts of eccentricity of the first surface A to be examined and the second surface B to be examined.

The method for measuring the eccentricity of the aspherical surface, according to the present invention, comprises the steps of finding an inclination angle shift change function $g_{A\ shift}(y)$ on the basis of the design data of the surface A of the aspherical lens; finding an inclination angle tilt change function $g_{A\ tilt}(y)$ on the basis of the design data of the surface A of the aspherical lens; actually measuring an inclination angle distribution of a tangent of the surface A of the aspherical lens; finding an inclination angle change function $g2\ (\delta_A, \beta_A, y)$ that is a difference between the inclination angle distribution of the surface A and the inclination angle distribution of the surface A in a noneccentric state that is the design value, on the basis of the result obtained in the actually measuring step; performing fitting of the inclination angle change function $g2\ (\delta_A, \beta_A, y)$ to a function expressed by a $\alpha g_{A\ shift}(y) + \beta g_{A\ tilt}(y)$; and finding the amounts of shift and tilt $(\delta_A, \epsilon_A) = (\alpha \delta_{A0}, \beta \epsilon_{A0})$ of the eccentricity of the surface A from $\alpha$ and $\beta$ found by the fitting.

Here, the inclination angle shift change function $g_{A\ shift}(y)$ refers to a function found by a difference between the inclination angle distribution where the surface A is moved in parallel by the amount of unit shift $\delta_{A0}$ and the inclination angle distribution in the noneccentric state. The inclination angle tilt change function $g_{A\ tilt}(y)$ refers to a function found by a difference between the inclination angle distribution where the surface A is rotated and moved with the amount of unit tilt $\epsilon_{A0}$ and the inclination angle distribution in the noneccentric state. The inclination angle change function $g2\ (\delta_A, \beta_A, y)$ is a difference between the inclination angle distribution of the surface A based on the actual measurement and the inclination angle distribution in the noneccentric state that is the design value.

The method for measuring the eccentricity of the aspherical surface, according to the present invention, comprises the steps of finding an inclination angle shift change function $g_{B\ shift}(y)$ on the basis of the design data of the surface B situated on the opposite side of the surface A of the aspherical lens in the above method; finding an inclination angle tilt change function $g_{B\ tilt}(y)$ on the basis of the design data of the surface B of the aspherical lens; actually measuring an inclination angle distribution of a tangent of the surface B of the aspherical lens; finding an inclination angle change function g2 ($\delta_B$, $\beta_B$, y) that is a difference between the inclination angle distribution of the surface B and the inclination angle distribution of the surface B in a noneccentric state that is the design value, on the basis of the result obtained in the actually measuring step; performing fitting of the inclination angle change function g2 ($\delta_B$, $\beta_B$, y) to a function expressed by $\alpha\ g_{B\ shift}(y) + \beta g_{B\ tilt}(y)$; finding the amounts of shift and tilt ($\delta_B$, $\epsilon_B$)=($\alpha\delta_{B0}$, $\beta\epsilon_{B0}$) of the eccentricity of the surface B from $\alpha$ and $\beta$ found by the fitting; and finding a face-to-face eccentricity ($\delta_A$-$\delta_B$, $\epsilon_A$-$\epsilon_B$) of the aspherical lens from the amounts of eccentricity of the surfaces A and B.

Here, the inclination angle shift change function $g_{B\ shift}(y)$ refers to a function found by a difference between the inclination angle distribution where the surface B is moved in parallel by the amount of unit shift $\delta_{B0}$ and the inclination angle distribution in the noneccentric state. The inclination angle tilt change function $g_{B\ tilt}(y)$ refers to a function found by a difference between the inclination angle distribution where the surface B is rotated and moved by the amount of unit tilt $\epsilon_{B0}$ and the inclination angle distribution in the noneccentric state. The inclination angle change function g2 ($\delta_B$, $\beta_B$, y) is a difference between the inclination angle distribution of the surface B based on the actual measurement and the inclination angle distribution in the noneccentric state that is the design value.

The features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
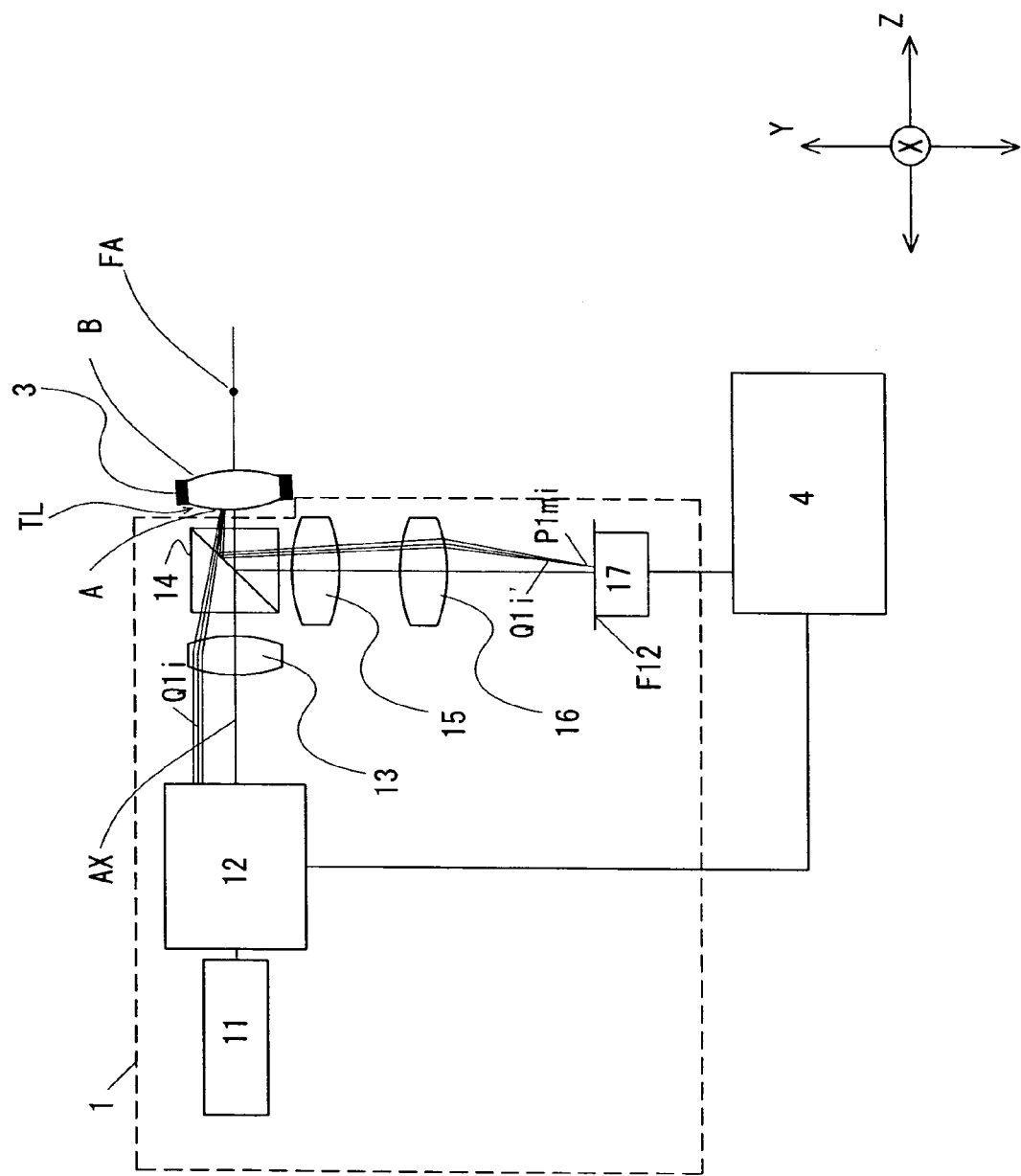
FIG. 1 is a view showing schematically a first embodiment of the apparatus for measuring the eccentricity of the aspherical surface according to the present invention.

FIG. 1 shows the first embodiment of the apparatus for measuring the eccentricity of the aspherical surface according to the present invention.

The apparatus for measuring the eccentricity of the aspherical surface, as shown in FIG. 1, comprises a measuring section 1 measuring the eccentricity of a surface A to be examined, of an aspherical lens TL; a holding means 3 holding the aspherical lens TL; and an arithmetical unit 4. Here, the aspherical lens TL is an object to be measured.

The measuring section 1 includes a light source unit 11, an angle changing means 12, a condenser lens 13, a light-splitting element 14, a collimator lens 15, an imaging lens 16, and a light-detecting element 17. Here, the light source unit 11 is constructed so that collimating light Q1 is produced. The condenser lens 13 serves to condense the rays Q1 emitted from the light source unit 11 toward the aspherical lens TL. More specifically, the arrangement of the condenser lens 13 is made such that the rays Q1 are condensed in the proximity of a center FA of paraxial curvature of the surface A to be examined.

The angle changing means 12 is interposed between the light source unit 11 and the condenser lens 13. The angle changing means 12 is such as to make the rays Q1 emitted from the light source unit 11 emerge at different angles. The rays Q1 are incident on the surface A at different angles through the angle changing means 12 and the condenser lens 13. Also, rays emerging from the angle changing means 12 are denoted by Q1i (i=1, 2, . . . , N).

The rays Q1i (i=1, 2, . . . , N) emerging from the angle changing means 12 are incident on the condenser lens 13. Here, the angle changing means 12 and the condenser lens 13 are constructed so that the rays Q1i (i=1, 2, . . . , N) are entered into on the surface A at angles $\theta 1i$ (i=1, 2, . . . , N) with an optical axis AX. The light-splitting element 14 is interposed between the condenser lens 13 and the aspherical lens TL. This light-splitting element 14 is a beam splitter, for instance. Each of the rays Q1i (i=1, 2, . . . , N) incident on the light-splitting element 14 is such that part of the ray is transmitted and the remaining potion is reflected. The rays Q1i (i=1, 2, . . . , N) transmitted through the light-splitting element 14 are incident on the aspherical lens TL and are condensed in the proximity of the center FA of paraxial curvature of the surface A to be examined.

Of the rays incident on the aspherical lens TL, rays Q1i' (i=1, 2, . . . , N) reflected by the surface A are turned back to the light-splitting element 14 and are then reflected by the light-splitting element 14. The rays Q1i' (i=1, 2, . . . , N) are incident on the collimator lens 15. By the collimator lens 15, the rays Q1i' (i=1, 2, . . . , N) are converted into nearly parallel light. The rays Q1i' (i=1, 2, . . . , N) converted into nearly parallel light are incident on the imaging lens 16. By the imaging lens 16, each ray Q1i' (i=1, 2, . . . , N) is focused at a given position. At this preset position, the light-detecting element 17 is placed. Thus, the spot position of the rays Q1i' (i=1, 2, . . . , N) can be detected by the light-detecting element 17.

In the apparatus for measuring the eccentricity of the aspherical surface of the first embodiment constructed as mentioned above, the collimating light Q1 emitted from the light source unit 11 propagates in turn along the optical paths at different distances away from the optical axis AX through the angle changing means 12. The light is converted into the rays Q1i (i=1, 2, . . . , N) that angles made with the optical axis AX are $\theta 1i$ (i=1, 2, . . . , N), through the condenser lens 13. The rays Q1i (i=1, 2, . . . , N) are incident in the proximity of the center FA of paraxial curvature of the surface A of the aspherical lens TL. Whereby, the rays Q1i' (i=1, 2, . . . , N) reflected by the surface A are produced. The rays Q1i' (i=1, 2, . . . , N) are condensed on the light-detecting element 17 through the light-splitting element 14, the collimator lens 15, and the imaging lens 16.

Figure 2A:
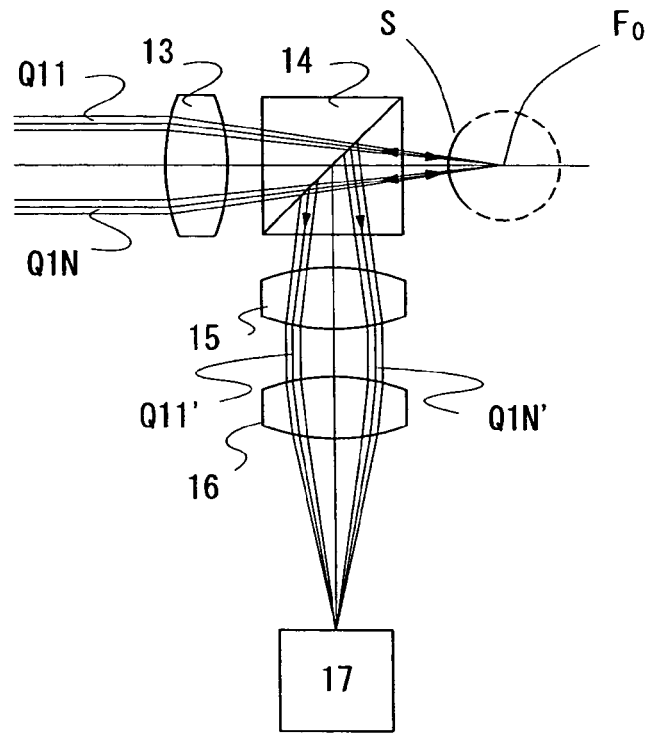
FIGS. 2A and 2B are explanatory views for comparison of reflected light from a spherical surface and an aspherical surface where condensed light is incident on the center of (paraxial) curvature, showing the traveling paths of the reflected light where surfaces to be examined are spherical and aspherical, respectively.
Figure 2B:
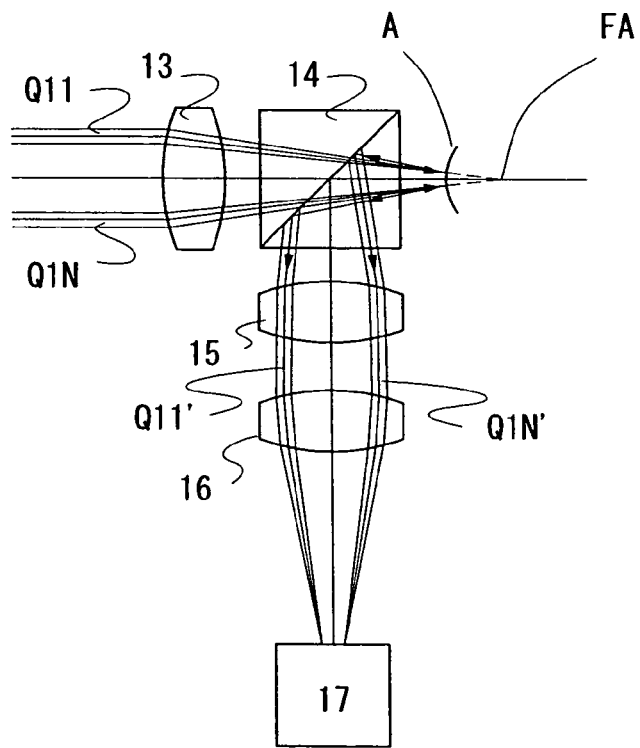

Here, in accordance with FIGS. 2A and 2B, reference is made to the principle that the amount of eccentricity of the surface A to be examined is found from spot positions P1mi of the rays Q1i' (i=1, 2, . . . , N).

It is now assumed that the surface A of the aspherical lens TL is not the aspherical surface, but a spherical surface S. In this case, the traveling paths of the rays Q1i' (i=1, 2, . . . , N) are as shown in FIG. 2A.

When the rays Q1i (i=1, 2, . . . , N) are condensed toward a center F0 of curvature of the spherical surface S, the rays Q1i' (i=1, 2, . . . , N) reflected by the spherical surface S, after passing through the collimator lens 15, become mutually parallel. The parallel rays are condensed in the proximity of a back focal plane F12 of the imaging lens 16. In this case, the light-detecting element 17 is situated at their condensing position, and the rays are condensed at the same point on the detecting surface.

When the surface A to be examined is the spherical surface S, the angle of incidence of each of the rays Q1i (i=1, 2, . . . , N) on the spherical surface S and the angle of reflection of each of the rays Q1i' (i=1, 2, . . . , N) at the spherical surface S are both zero. Consequently, the rays Q1i' (i=1, 2, . . . , N), after reflection from the spherical surface S, turn back the traveling paths coinciding with the incident paths. The rays are then reflected by the light-splitting element 14 and, upon passing through the collimator lens 15, become parallel with the optical axis of the imaging lens 16. Therefore, when the rays are collected by the imaging lens 16, they are condensed at the same point (position).

On the other hand, it is assumed that the surface B to be examined, as shown in FIG. 2B, is the aspherical surface. In this case, the angle of incidence of each of the rays Q1i (i=1, 2, . . . , N) on the aspherical surface takes the value different from zero, depending on its incident position. Hence, the angle of reflection of each of the rays Q1i' (i=1, 2, . . . , N) at the aspherical surface is also different from zero. Consequently, the rays Q1i' (i=1, 2, . . . , N) turn back the traveling paths different from the incident paths. The rays are reflected by the light-splitting element 14 and, upon passing through the collimator lens 15, fail to become parallel with the optical axis of the imaging lens 16. Therefore, when the rays Q1i' (i=1, 2, . . . , N) are collected by the imaging lens 16, they are not condensed at the same point (position).

As mentioned above, the position of a condensed point (a spot) varies with the rays Q1i' (i=1, 2, . . . , N). Here, the spot position of the rays Q1i' (i=1, 2, . . . , N) is denoted by P1mi ($i=1, 2, \ldots, N$). Such spot positions P1mi ($i=1, 2, \ldots, N$) indicate the profile and eccentric condition of the spherical surface. It becomes thus possible that the spot positions are used to thereby measure the eccentricity of the surface A to be examined. The spot positions P1mi ($i=1, 2, \ldots, N$) are detected and stored by the light-detecting element 17.

Subsequently, a description is given of how the measured result is processed. In the arithmetical unit 4, the design data of the surface A to be examined, of the aspherical lens TL are previously input (stored). Thus, the spot positions P1i ($i=1, 2, \ldots, N$) of the rays Q1i' ($i=1, 2, \ldots, N$) where the surface A has no eccentricity are calculated on the basis of the design data. In this case, the spot positions P1i ($i=1, 2, \ldots, N$) may be previously calculated.

On the other hand, the surface A has unknown eccentricity, and its information is contained in the spot positions P1mi ($i=1, 2, \ldots, N$). Therefore, it can be easily supposed that a difference between each of the spot positions P1i ($i=1, 2, \ldots, N$) and each of the spot positions P1mi ($i=1, 2, \ldots, N$) is responsible for the eccentricity of the surface A. Thus, from the difference between the spot position P1i ($i=1, 2, \ldots, N$) and the spot position P1mi ($i=1, 2, \ldots, N$), the inclination angle change function of the surface A is found. From the feature of this function, the amount of eccentricity of the surface A is found.

Also, the inclination angle change function refers to a function expressing the amount of variation of a tangent or normal angle by the eccentricity of the aspherical surface. The coordinate system of the inclination angle change function to be used is fixed with respect to the eccentricity.

Figure 3:
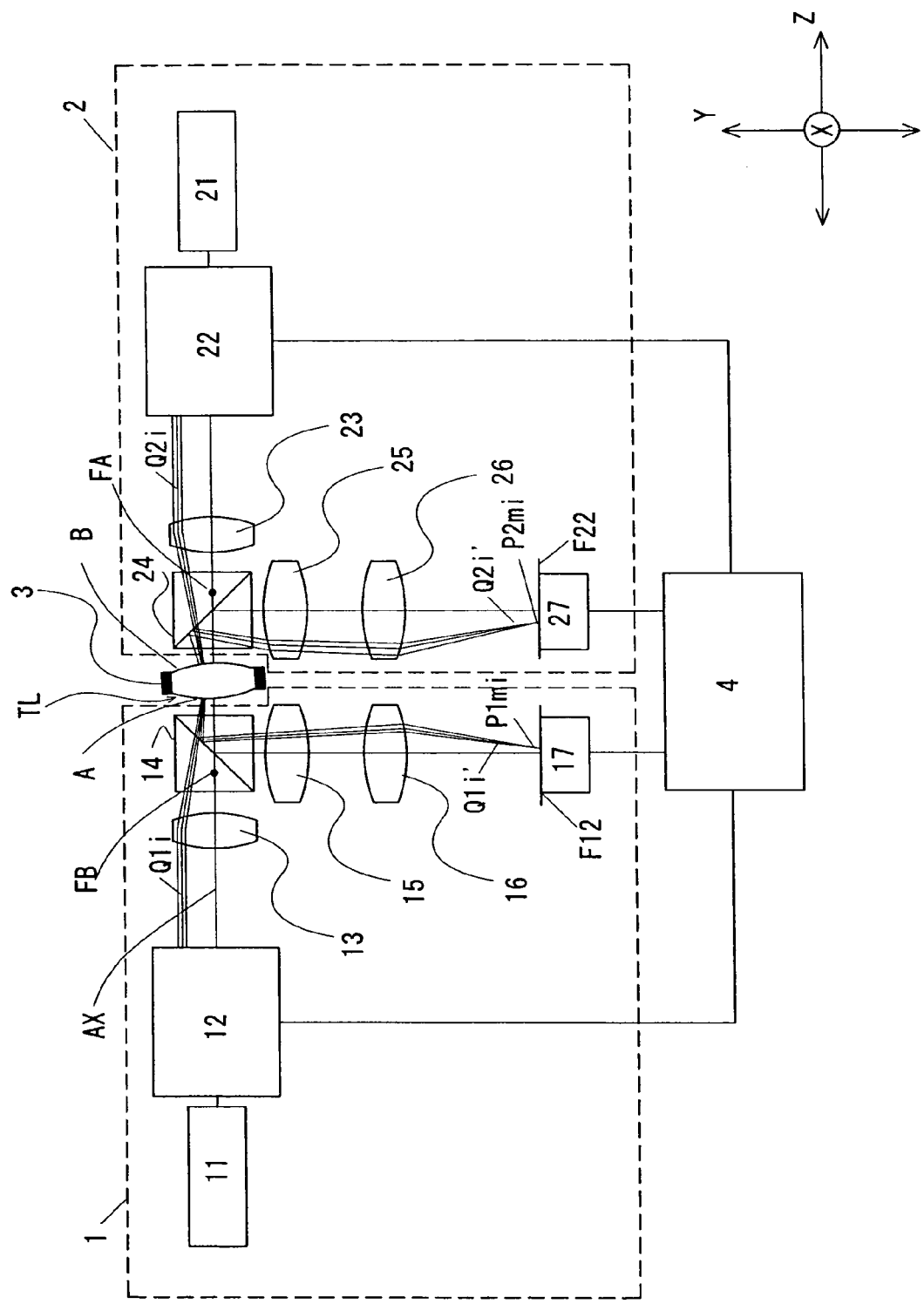
FIG. 3 is a view showing schematically a second embodiment of the apparatus for measuring the eccentricity of the aspherical surface.

FIG. 3 shows the second embodiment of the apparatus for measuring the eccentricity of the aspherical surface according to the present invention.

The apparatus for measuring the eccentricity of the aspherical surface according to the second embodiment, as shown in FIG. 3, comprises the first measuring section 1 measuring the eccentricity of the surface A to be examined, of the aspherical lens TL; a second measuring section 2 measuring a surface B to be examined; the holding means 3 holding the aspherical lens TL; and the arithmetical unit 4. The first measuring section 1 has the same construction as in FIG. 1. The second measuring section 2 is also designed to be the same as the first measuring section 1. Specifically, the second measuring section 2 also includes a second light source unit 21, a second angle changing means 22, a second condenser lens 23, a second light-splitting element 24, a second collimator lens 25, a second imaging lens 26, and a second light-detecting element 27. The second light source unit 21 is constructed so that collimating light Q2 is produced. The second condenser lens 23 serves to condense the rays Q2 emitted from the second light source unit 21 toward the aspherical lens TL. More specifically, the arrangement of the condenser lens 23 is made such that the rays Q2 are condensed in the proximity of a center FB of paraxial curvature of the surface B to be examined.

The second angle changing means 22 is interposed between the second light source unit 21 and the second condenser lens 23. The second angle changing means 22 is such as to make the rays Q2 emitted from the second light source unit 21 emerge at different angles. The rays Q2 are incident on the surface B at different angles through the angle changing means 22 and the condenser lens 23. Also, rays emerging from the second angle changing means 22 are denoted by Q2i ($i=1, 2, \ldots, N$).

The rays Q2i ($i=1, 2, \ldots, N$) emerging from the second angle changing means 22 are incident on the second condenser lens 23. The second angle changing means 22 and the second condenser lens 23 are constructed so that the rays Q2i ($i=1, 2, \ldots, N$) are rendered incident on the surface B at angles $\theta 2i$ ($i=1, 2, \ldots, N$) with an optical axis AX. The second light-splitting element 24 is interposed between the second condenser lens 23 and the aspherical lens TL. The light-splitting element 24 is a beam splitter, for instance. Each of the rays Q2i ($i=1, 2, \ldots, N$) incident on the second light-splitting element 24 is such that part of the ray is transmitted and the remaining potion is reflected. The rays Q2i ($i=1, 2, \ldots, N$) transmitted through the second light-splitting element 24 are incident on the aspherical lens TL and are condensed in the proximity of the center FB of paraxial curvature of the surface B to be examined.

Of the rays incident on the aspherical lens TL, rays Q2i' ($i=1, 2, \ldots, N$) reflected by the surface B are turned back to the second light-splitting element 24 and are then reflected by the second light-splitting element 24. The rays Q2i' ($i=1, 2, \ldots, N$) are incident on the second collimator lens 25. In the second collimator lens 25, the rays Q2i' ($i=1, 2, \ldots, N$) are converted into nearly parallel light. The rays Q2i' ($i=1, 2, \ldots, N$) converted into nearly parallel light are incident on the second imaging lens 26. By the second imaging lens 26, the rays Q2i' ($i=1, 2, \ldots, N$) are condensed at a preset position. At this preset position, the second light-detecting element 27 is placed. Thus, the spot position of the rays Q2i' ($i=1, 2, \ldots, N$) can be detected by the second light-detecting element 27.

In the second measuring section constructed as mentioned above, the collimating light Q2 emitted from the second light source unit 21 propagates in turn along the optical paths at different distances away from the optical axis AX through the second angle changing means 22. The light is converted into the rays Q2i ($i=1, 2, \ldots, N$) that angles made with the optical axis AX are $\theta 2i$ ($i=1, 2, \ldots, N$), through the second condenser lens 23. The rays Q2i ($i=1, 2, \ldots, N$) are incident in the proximity of the center FB of paraxial curvature of the surface B of the aspherical lens TL. Whereby, the rays Q2i' ($i=1, 2, \ldots, N$) reflected by the surface B are produced. The rays Q1i' ($i=1, 2, \ldots, N$) are condensed on the second light-detecting element 27 through the second light-splitting element 24, the second collimator lens 25, and the second imaging lens 26. Here, the spot positions P2mi ($i=1, 2, \ldots, N$) of the rays Q1i' ($i=1, 2, \ldots, N$) are detected and stored by the second detecting element 27.

Subsequently, a description is given of how the measured result is processed. The surface A is as described in the first embodiment. In the surface B also, the same processing is performed. In the arithmetical unit 4, the design data of the surface B to be examined, of the aspherical lens TL are previously input (stored). Thus, the spot positions P2i ($i=1, 2, \ldots, N$) of the rays Q1i' ($i=1, 2, \ldots, N$) where the surface B has no eccentricity are calculated on the basis of the design data. In this case, the spot positions P2i ($i=1, 2, \ldots, N$) may be previously calculated.

On the other hand, the surface B has unknown eccentricity, and its information is contained in the spot positions P2mi ($i=1, 2, \ldots, N$). Therefore, it can be easily supposed that a difference between each of the spot positions P2i ($i=1, 2, \ldots, N$) and each of the spot positions P2mi ($i=1, 2, \ldots, N$) is responsible for the eccentricity of the surface B. Thus, from the difference between the spot position P2i ($i=1, 2, \ldots, N$) and the spot position P2mi ($i=1, 2, \ldots, N$), the inclination angle change function of the surface B is found. From the feature of this function, the amount of eccentricity of the surface B is found. The inclination angle change function and the coordinate system of the inclination angle change function are the same as in the first embodiment.

As mentioned above, in the surfaces A and B to be examined, the amounts of eccentricity are found. From these amounts of eccentricity, the face-to-face eccentricity of the aspherical lens TL can be calculated.

Figure 4:
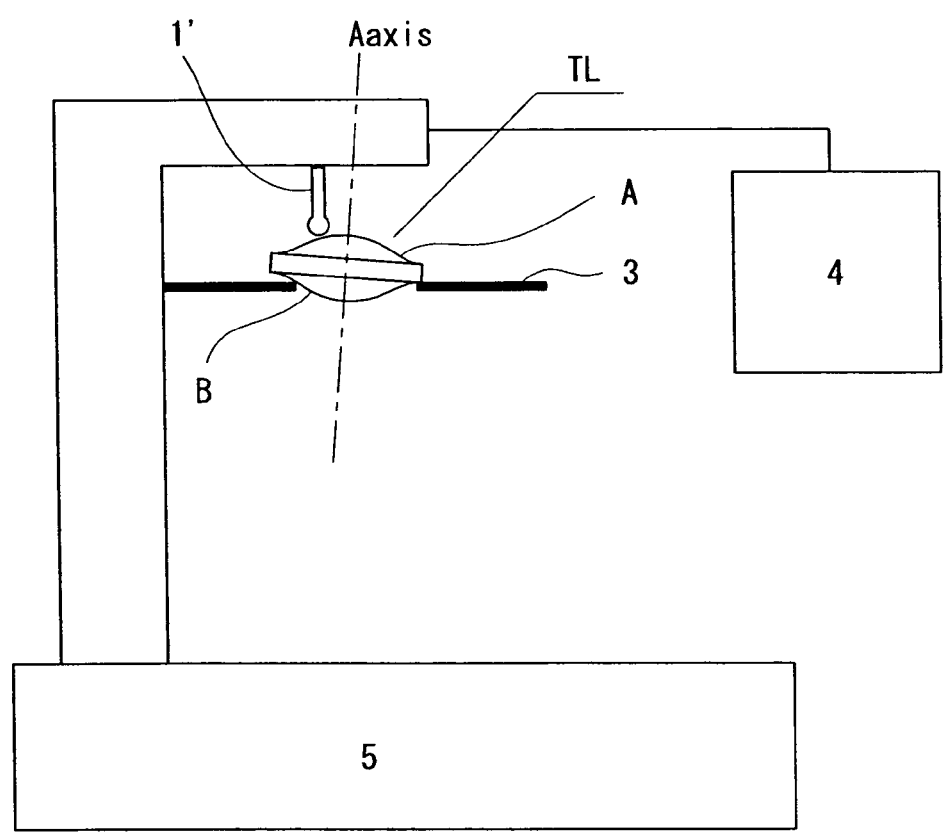
FIG. 4 is a view showing schematically a third embodiment of the apparatus for measuring the eccentricity of the aspherical surface.

FIG. 4 shows the third embodiment of the apparatus for measuring the eccentricity of the aspherical surface according to the present invention.

The apparatus for measuring the eccentricity of the aspherical surface according to the second embodiment comprises a detecting means 1', the holding means 3 holding the aspherical lens TL, the arithmetical unit 4, and a reference base 5. The detecting means 1' is moved (scanned) along the surface A to be examined, of the aspherical surface TL to measure the profile of the surface A. The measured result is stored in the arithmetical unit 4. The arithmetical unit 4 is such as to calculate the inclination angle distribution (function) of the surface A from the measured result. Also, the inclination angle distribution is on the basis of the reference base 5. From the inclination angle distribution, the amount of eccentricity of the surface A is calculated.

Figure 5:
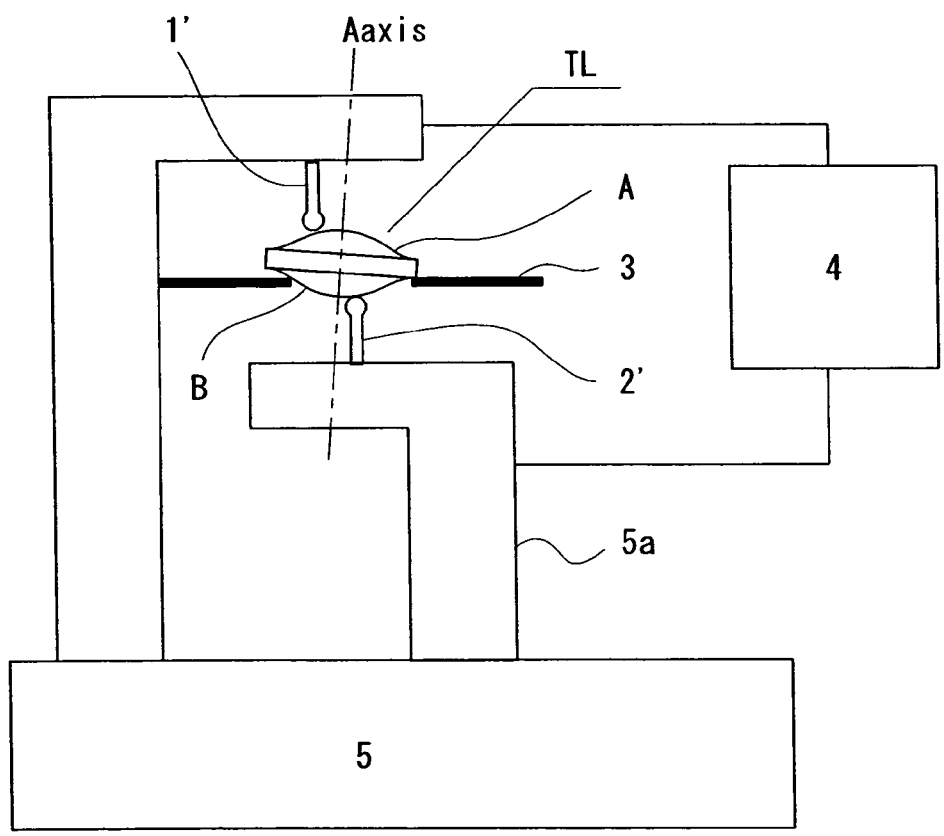
FIG. 5 is a view showing schematically a fourth embodiment of the apparatus for measuring the eccentricity of the aspherical surface.
Figure 5:
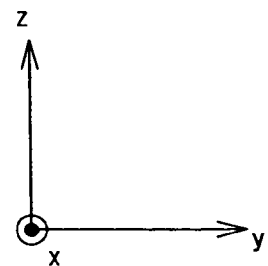

FIG. 5 shows the fourth embodiment of the apparatus for measuring the eccentricity of the aspherical surface according to the present invention.

In the apparatus for measuring the eccentricity of the aspherical surface of the fourth embodiment, another detecting means is added to the third embodiment. Specifically, a second detecting means 2' is provided for the purpose of measuring the surface B to be examined, of the aspherical surface TL. To support the second detecting means 2', a supporting member 5a is mounted on the reference base 5. The second detecting means 2' is moved (scanned) along the surface B to be examined, of the aspherical surface TL to measure the profile of the surface B. The measured result is stored in the arithmetical unit 4. The arithmetical unit 4 is such as to calculate the inclination angle distribution (function) of the surface B from the measured result. Also, the inclination angle distribution is on the basis of the reference base 5. From the amounts of eccentricity of the two surfaces, the face-to-face eccentricity of the aspherical lens TL can be calculated.

Subsequently, reference is made to the procedure of calculating the amount of eccentricity of the surface to be examined, of the aspherical lens TL in the first to fourth embodiments. As an example, the amount of eccentricity $(\delta_A, \epsilon_A)$ of the surface A to be examined is calculated here.

Also, it is assumed that when the surface A is entirely free of eccentricity, it comes in contact with the x-y plane at its vertex. It is also assumed that the parallel movement of the surface A in a direction perpendicular to the optical axis AX is called a shift and the rotating movement of the surface A relative to the optical axis AX is called a tilt. Further, the amount of parallel movement in the x-y plane is referred to as the amount of shift $\delta$, and an angle made by an aspherical axis $A_{axis}$ changed by the rotating movement with the z axis is referred to as the amount of tilt $\epsilon$. Using the amount of shift $\delta$ and the amount of tilt $\epsilon$, the amount of eccentricity is expressed by $(\delta, \epsilon)$.

In the method for measuring the eccentricity of the aspherical surface, the amount of variation of the inclination angle of the aspherical surface caused by the eccentricity is utilized to find the amount of eccentricity $(\delta_A, \epsilon_A)$ of the surface A to be examined.

In general, the amount of variation of the inclination angle can be thought of as equal to the amount of variation of the tangent. Thus, the inclination angle change function indicating the amount of variation of the inclination angle is found from the change of the tangent as described below.

Figure 6A:
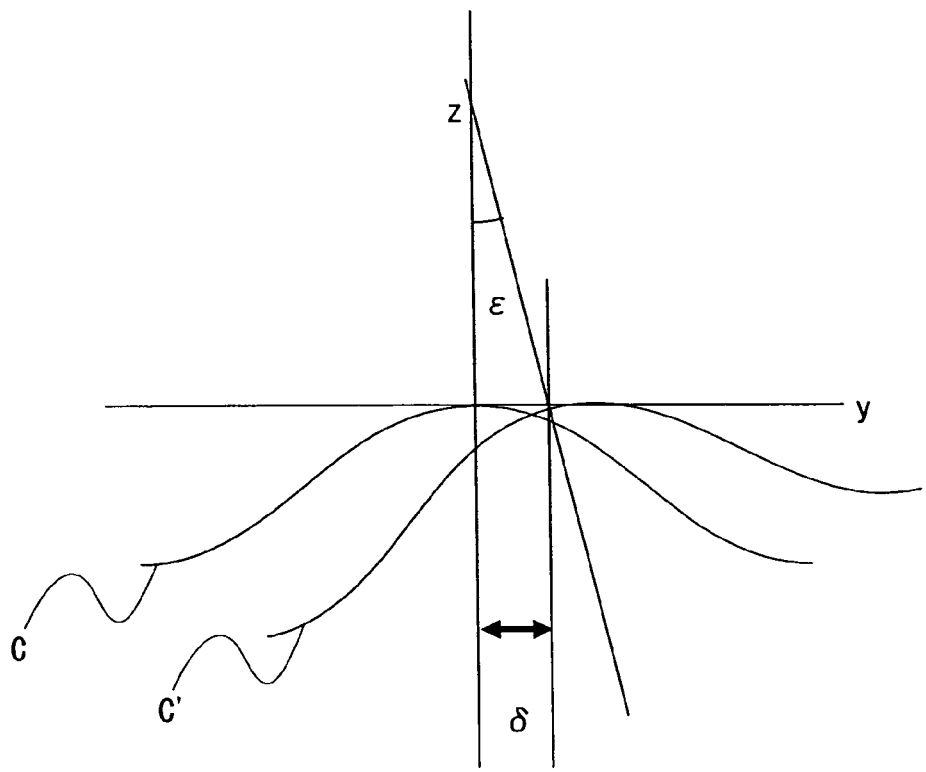
FIGS. 6A and 6B are explanatory views showing states where an aspherical axis is made to coincide with a z axis and the aspherical surface, with an x-y plane as a tangent plane, is viewed as a y-z section, indicating the amounts of shift and tilt relative to a noneccentric state and arbitrary eccentricity, the section of the aspherical surface of the noneccentric state, the section of the aspherical surface with shift eccentricity, and the section of the aspherical surface with tilt eccentricity.
Figure 6B:
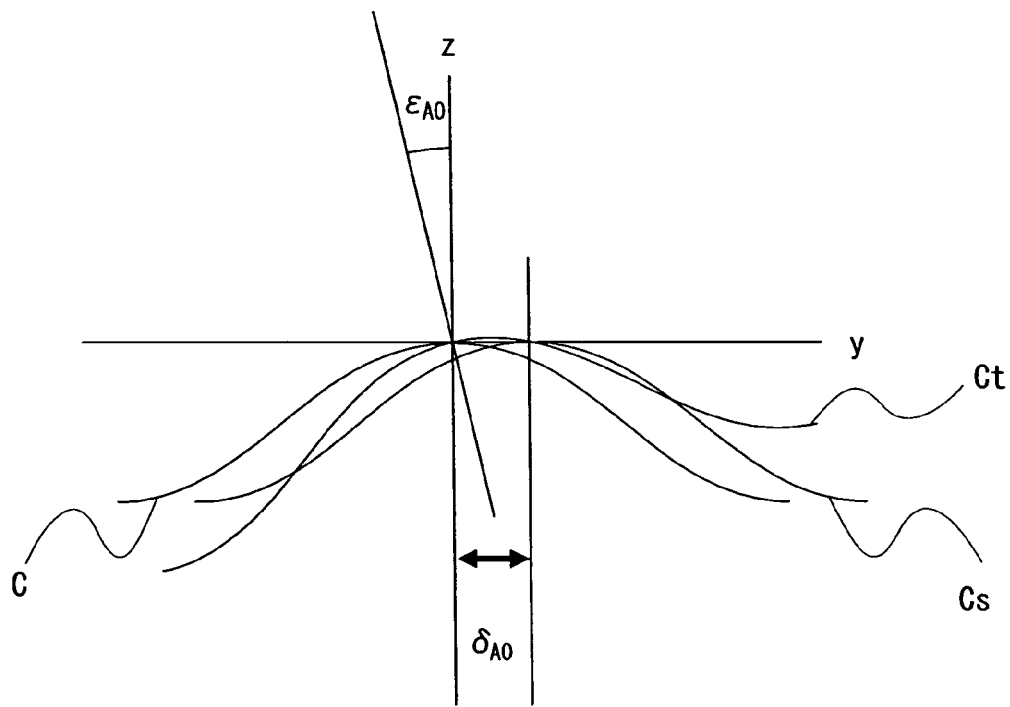

FIGS. 6A and 6B show states where the aspherical axis is made to coincide with the z axis and the surface A, with the x-y plane as a tangent plane, is viewed as the y-z section. When a curved line C of an intersection of the surface A with the y-z plane (see FIG. 6A) is regarded as a function $f_A(y)$, the function $f_A(y)$ is expressed by the following equation:

$$z = f_A(y) = \frac{y^2}{R_0 + R_0\sqrt{1 - (k+1)\left(\frac{Y}{R_0}\right)^2}} + \sum_{i=2}^{N} A_{2i} y^{2i} \quad (1)$$

It is now assumed that the surface A to be examined is changed to an aspherical surface a by arbitrary eccentricity $(\delta_A, \epsilon_A)$ and a function $f_a(y)$ of a line C' of an intersection with the y-z plane in this case is given as the following equation:

$$z = f_a(y) \quad (2)$$

An inclination angle change function g1 $(67_A, \epsilon_A, y)$ of the aspherical surface a is expressed by the following equation:

$$g1(\delta_A, \epsilon_A, y) = \frac{\partial f_a(y)}{\partial y} - \frac{\partial f_A(y)}{\partial y} \quad (3)$$

Next, when the surface A is shifted along of the y axis by the amount of unit shift $\delta_{A0}$, this surface is called an aspherical surface As. The function of a line Cs of an intersection of the aspherical surface As with the y-z plane (see FIG. 6B) is denoted by $f_{As}(\delta_{A0}, y)$. When the aspherical surface As is rotated around the x axis by the amount of unit tilt $\epsilon_{A0}$, this surface is called an aspherical surface At. The function of a line Ct of an intersection of the aspherical surface with the y-z plane (see FIG. 6B) is denoted by $f_{At}(\epsilon_{A0}, y)$.

When $g_{A\,shift}(y)$ represents an inclination angle shift change function of the surface A changed by the amount of unit shift $\delta_{A0}$ and $g_{A\,tilt}(y)$ represents an inclination angle tilt change function of the surface A changed by the amount of unit tilt $\epsilon_{A0}$, the functions $g_{A\,shift}(y)$ and $g_{A\,tilt}(y)$ are found by the following equations:

$$g_{A\,shift}(y) = \frac{\partial f_{As}(\delta, y)}{\partial y} - \frac{\partial f_A(y)}{\partial y} \quad (4)$$

$$g_{A\,tilt}(y) = \frac{\partial f_{At}(\epsilon, y)}{\partial y} - \frac{\partial f_A(y)}{\partial y} \quad (5)$$

In the method for measuring the eccentricity of the aspherical surface of the present invention, the inclination angle shift change function $g_{A\,shift}(y)$ and the inclination angle tilt change function $g_{A\ tilt}$ (y) are used and thereby the inclination angle change function g1 ($\delta_A$, $\epsilon_A$, y) is expressed as Equation (6) described below. Also, to avoid confusion with Equation (3), the inclination angle change function of Equation (6) is denoted by g2 ($\delta_A$, $\epsilon_A$, y).

$$g2(\delta_A, \epsilon_A, y) = \frac{\delta_A}{\delta_{A0}} g_{A\ shift}(y) + \frac{\epsilon_A}{\epsilon_{A0}} g_{A\ tilt}(y) \quad (6)$$

Next, the fitting of the inclination angle change function g1 ($\delta_A$, $\epsilon_A$, y) found by Equation (3) to the inclination angle shift and tilt change functions $g_{A\ shift}$ (y) and $g_{A\ tilt}$ (y) is performed, as in Equation (7) described below, to find coefficients α and β.

$$g1(\delta_A, \epsilon_A, y) = \alpha g_{A\ shift}(y) + \beta g_{A\ tilt}(y) \quad (7)$$

Since the function g2 ($\delta_A$, $\epsilon_A$, y) of Equation (6) and the function g1 ($\delta_A$, $\epsilon_A$, y) of Equation (7) express the same function, the relation of Equation (8) described below is established between the arbitrary amount of eccentricity ($\delta_A$, $\epsilon_A$) of the surface A and the amounts of unit shift and unit tilt $\delta_{A0}$ and $\epsilon_{A0}$.

$$(\delta_A, \epsilon_A) = (\alpha \delta_{A0}, \beta \epsilon_{A0}) \quad (8)$$

Next, the establishment of Equation (6) is described by a specific example.

An aspherical surface of the specification shown in Table 1 is prepared as the surface A to be examined to find the functions $g_{A\ shift}$ (y) and $g_{A\ tilt}$ (y) where the amount of unit shift $\delta_{A0}=1$ μm and the amount of unit tilt $\epsilon_{A0}=0.1$ min., respectively.

In Table 1, reference symbol $R_0$ represents the radius of curvature of the surface A to be examined, k represents a conic constant, and $A_4$, $A_6$, $A_8$, $A_{10}$, and $A_{12}$ are aspherical coefficients. When z is taken as the coordinate in the direction of the optical axis and y is taken as the coordinate in the direction normal to the optical axis, the configuration of the aspherical surfaces is expressed by the following equation:

$$z = (y^2/R_0)/[1 + \{1-(1+k)(y/R_0)^2\}^{1/2}] + A_4 y^4 + A_6 y^6 + A_8 y^8 + A_{10} y^{10}$$

TABLE 1

| $R_0$ | Limit of y | k | $A_4$ | $A_6$ | $A_8$ | $A_{10}$ | $A_{12}$ |
|---|---|---|---|---|---|---|---|
| −30 | −15 < y < 15 | −1 | 0 | 0 | 0 | 0 | 0 |

However, the inclination angle shift function $g_{A\ shift}$ (y) and the inclination angle tilt function $g_{A\ tilt}$ (y) are obtained by the procedures of:
(i) finding noneccentric sequential data (y, z) of the surface A to be examined, expressed by Equation (1),
(ii) shifting the noneccentric sequential data (y, z) by the amount of unit shift $\delta_{A0}$ to find unit shift sequential data (ys, zs),
(iii) transforming the noneccentric sequential data (y, z) by rotation matrix T to thereby find unit tilt sequential data (yt, zt) with the amount of unit tilt $\epsilon_{A0}$,
(iv) finding differential sequential data (y, z'), (ys, zs'), and (yt, zt') of the noneccentric sequential data (y, z), the unit shift sequential data (ys, zs), and the unit tilt sequential data (yt, zt), and
(v) approximating the differential sequential data (y, z'), (ys, zs'), and (yt, zt') to polynomials by the least squares method and regarding the obtained polynomials as $\partial f_A$ (y)/$\partial$y, $\partial f_{As}$ ($\delta_0$, y)/$\partial$y, and $\partial f_{At}$ ($\epsilon_0$, y)/$\partial$y to find the inclination angle shift change function $g_{A\ shift}$ (y) and the inclination angle tilt change function $g_{A\ tilt}$ (y) from Equations (4) and (5).

SPECIFIC EXAMPLE 1 (SLIGHT ECCENTRICITY)

Specific example 1 shows that when an arbitrary amount of eccentricity is very slight, Equation (6) is established.

Figure 7:
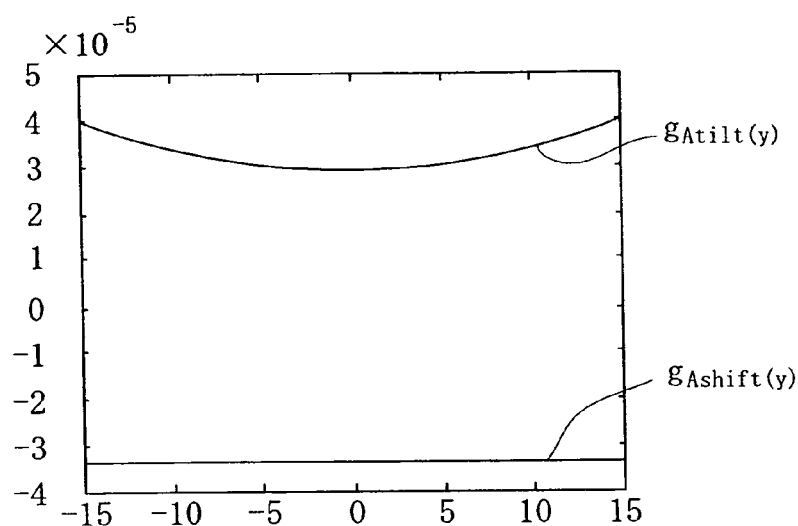
FIG. 7 is a graph showing the inclination angle shift change function and the inclination angle tilt change function where the eccentricities of the aspherical surface with a shift of 1 μm and a tilt of 0.1 minutes, shown in Table 1, are separately produced.

The inclination angle shift change function $g_{A\ shift}$ (y) and the inclination angle tilt change function $g_{A\ tilt}$ (y) where the amount of unit shift $\delta_{A0}=1$ μm and the amount of unit tilt $\epsilon_{A0}=0.1$ min. are shown in FIG. 7. In this figure, it is seen that the inclination angle shift change function $g_{A\ shift}$ (y) and the inclination angle tilt change function $g_{A\ tilt}$ (y) are different in profile.

Figure 8:
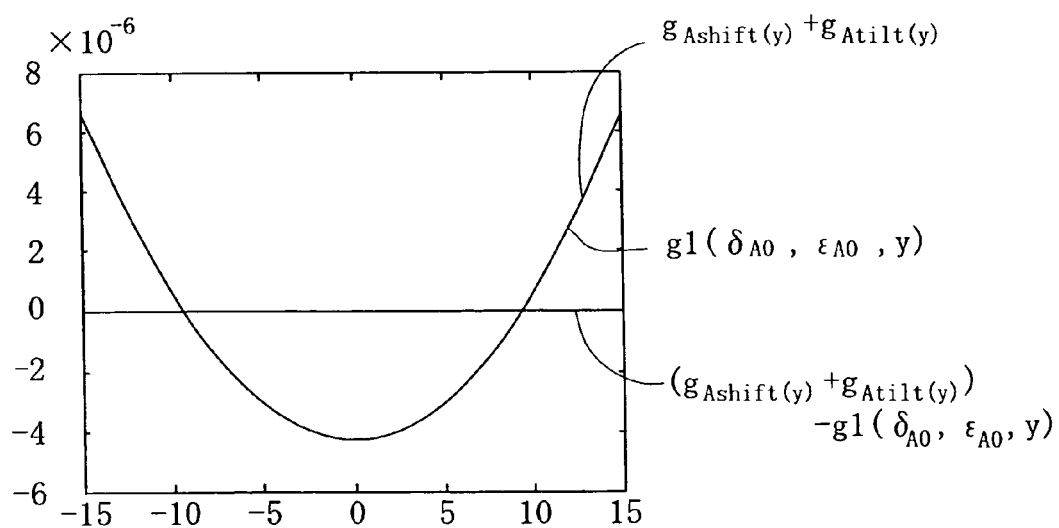
FIG. 8 is a graph showing a comparison between the inclination angle change function obeying Equation (3) where the eccentricities of the aspherical surface with a shift of 1 μm and a tilt of 0.1 minutes, shown in Table 1, are produced simultaneously and the inclination angle change function obeying Equation (6) expressed by the sum of the inclination angle shift change function and the inclination angle tilt change function, shown in FIG. 7.

An inclination angle change function g1 ($\delta_{A0}$, $\epsilon_{A0}$, y) found according to Equation (3) and an inclination angle change function g2 ($\delta_{A0}$, $\epsilon_{A0}$, y) found as α=1 and β=1 in Equation (7) are shown in FIG. 8.

From this figure, it is seen that there is little difference between the inclination angle change function g1 ($\delta_{A0}$, $\epsilon_{A0}$, y) and the inclination angle change function g2 ($\delta_{A0}$, $\epsilon_{A0}$, y)=$g_{A\ shift}$ (y)+$g_{A\ tilt}$ (y). Specifically, it is seen that g1 ($\delta_{A0}$, $\epsilon_{A0}$, y)=g2 ($\delta_{A0}$, $\epsilon_{A0}$, y) and Equation (6) is established.

SPECIFIC EXAMPLE 2 (CONSIDERABLE ECCENTRICITY)

Specific example 2 shows that when an arbitrary amount of eccentricity is considerable, Equation (6) is established.

Figure 9:
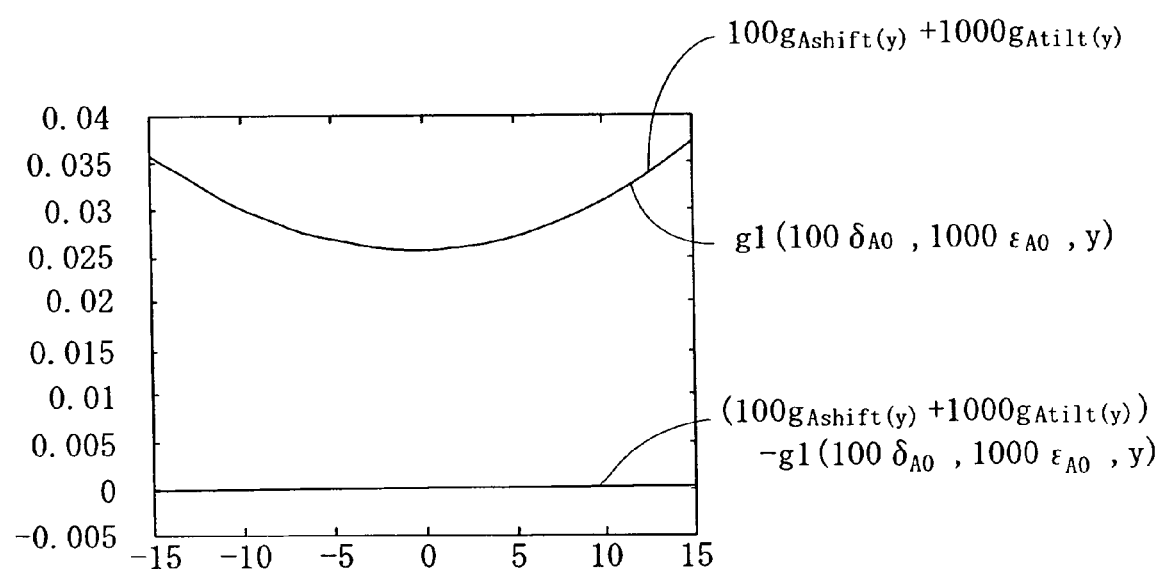
FIG. 9 is a graph showing a comparison between the inclination angle change function obeying Equation (3) where the eccentricities of the aspherical surface with a shift of 100 μm and a tilt of 100 minutes, shown in Table 1, are produced simultaneously and the inclination angle change function obeying Equation (6) expressed by the sum of the inclination angle shift change function and the inclination angle tilt change function, shown in FIG. 7 and multiplied by 100 and 1000, respectively.

The arbitrary amount of eccentricity of the surface A to be examined is assumed to be 100 μm and 100 minutes. The inclination angle change function g1 (100 μm, 100 minutes, y)=g1 (100 $\delta_0$, 1000 $\epsilon_{A0}$, y) according to Equation (3) and the inclination angle change function g2 (100 μm, 100 minutes, y)=100 $g_{A\ shift}$ (y)+1000 $g_{A\ tilt}$ (y) according to Equation (6) are shown in FIG. 9.

From this figure, it is seen that although the amount of shift is 100 times and the amount of tilt is 100 time much larger than in Specific example 1, there is little difference between the inclination angle change function g1 (100 μm, 100 minutes, y) and the inclination angle change function g2 (100 μm, 100 minutes, y) and Equation (6) is established.

SPECIFIC EXAMPLE 3 (OTHER ASPHERICAL CONFIGURATIONS)

Specific example 3 shows that, even in aspherical surfaces other than that of Table 1, Equation (6) is established.

Data of aspherical surfaces used in Specific example 3 are listed in Table 2.

TABLE 2

| No. | $R_0$ (mm) | Limit of y | k | $A_4$ | $A_6$ | $A_8$ | $A_{10}$ | $(\delta_{A0}, \epsilon_{A0})$ (μm, min.) |
|---|---|---|---|---|---|---|---|---|
| 1 | 12.5 | $-3 < y < 3$ | $-0.6$ | 1.8E$-$4 | $-1.6$E$-$7 | 1.0E$-$8 | $-7.0$E$-$10 | (100, 30) |
| 2 | $-60.0$ | $-5 < y < 5$ | 70 | $-1.5$E$-$4 | $-1.0$E$-$9 | 2.0E$-$9 | 0 | (30, 20) |
| 3 | 10.0 | $-4.8 < y < 4.8$ | 0 | $-1.8$E$-$4 | 3.3E$-$9 | $-8.0$E$-$10 | $-1.0$E$-$9 | (20, 4) |

Figure 10:
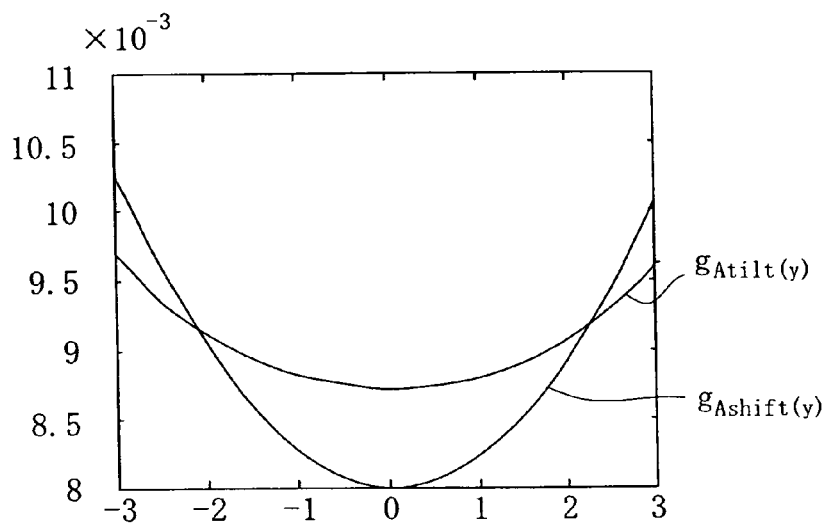
FIG. 10 is a graph showing the inclination angle shift change function and the inclination angle tilt change function where the eccentricities of the aspherical surface with a shift of 1 μm and a tilt of 0.1 minutes, shown in the first row of Table 2, are separately produced.
Figure 11:
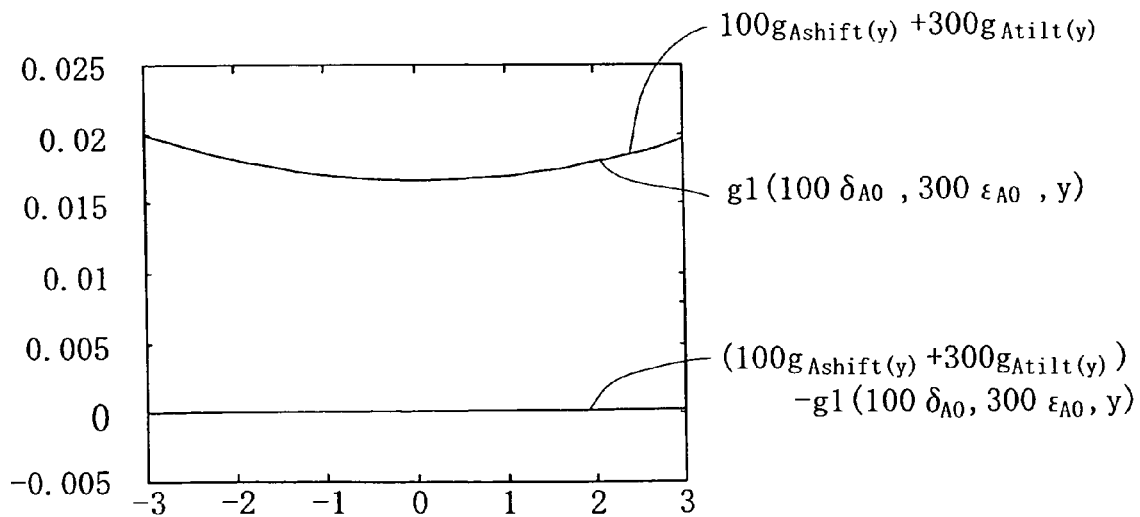
FIG. 11 is a graph showing a comparison between the inclination angle change function obeying Equation (3) where the eccentricities of the aspherical surface with a shift of 100 μm and a tilt of 30 minutes, shown in the first row of Table 2, are produced simultaneously and the inclination angle change function obeying Equation (6) expressed by the sum of the inclination angle shift change function and the inclination angle tilt change function, shown in FIG. 10 and multiplied by 100 and 300, respectively.
Figure 12:
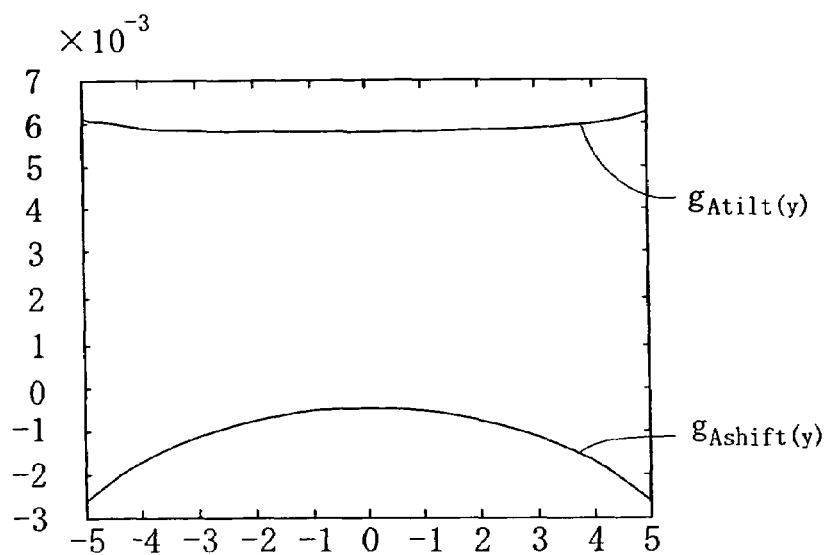
FIG. 12 is a graph showing the inclination angle shift change function and the inclination angle tilt change function where the eccentricities of the aspherical surface with a shift of 1 μm and a tilt of 0.1 minutes, shown in the second row of Table 2, are separately produced.
Figure 13:
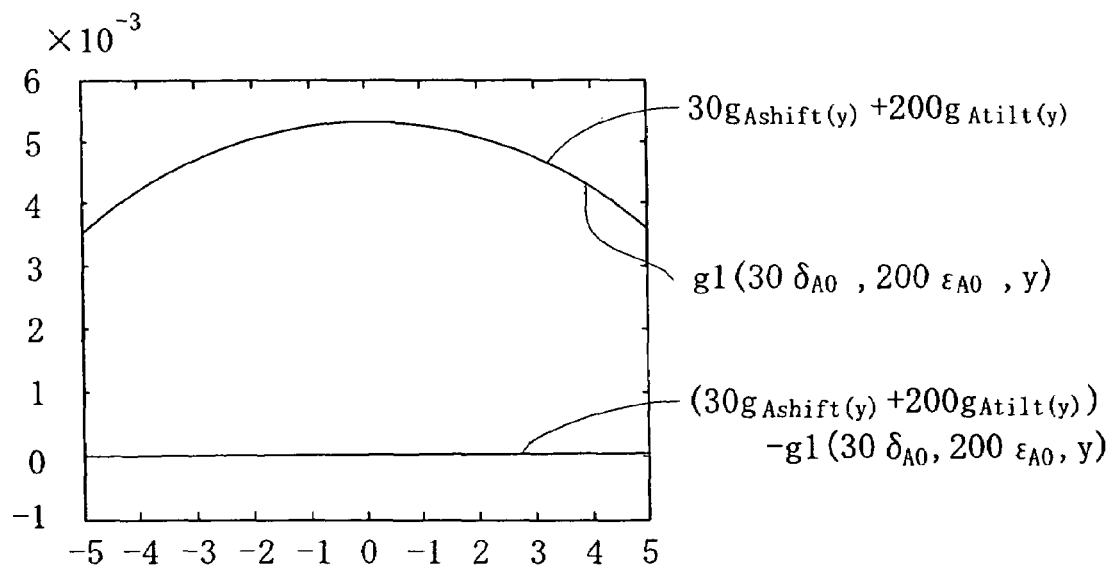
FIG. 13 is a graph showing a comparison between the inclination angle change function obeying Equation (3) where the eccentricities of the aspherical surface with a shift of 30 μm and a tilt of 20 minutes, shown in the second row of Table 2, are produced simultaneously and the inclination angle change function obeying Equation (6) expressed by the sum of the inclination angle shift change function and the inclination angle tilt change function, shown in FIG. 12 and multiplied by 30 and 200, respectively.
Figure 14:
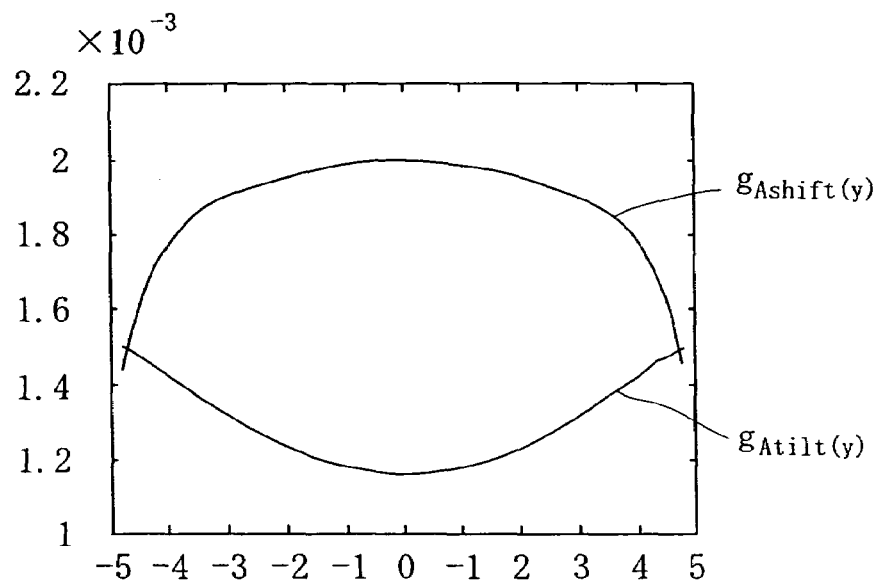
FIG. 14 is a graph showing the inclination angle shift change function and the inclination angle tilt change function where the eccentricities of the aspherical surface with a shift of 1 μm and a tilt of 0.1 minutes, shown in the third row of Table 2, are separately produced.
Figure 15:
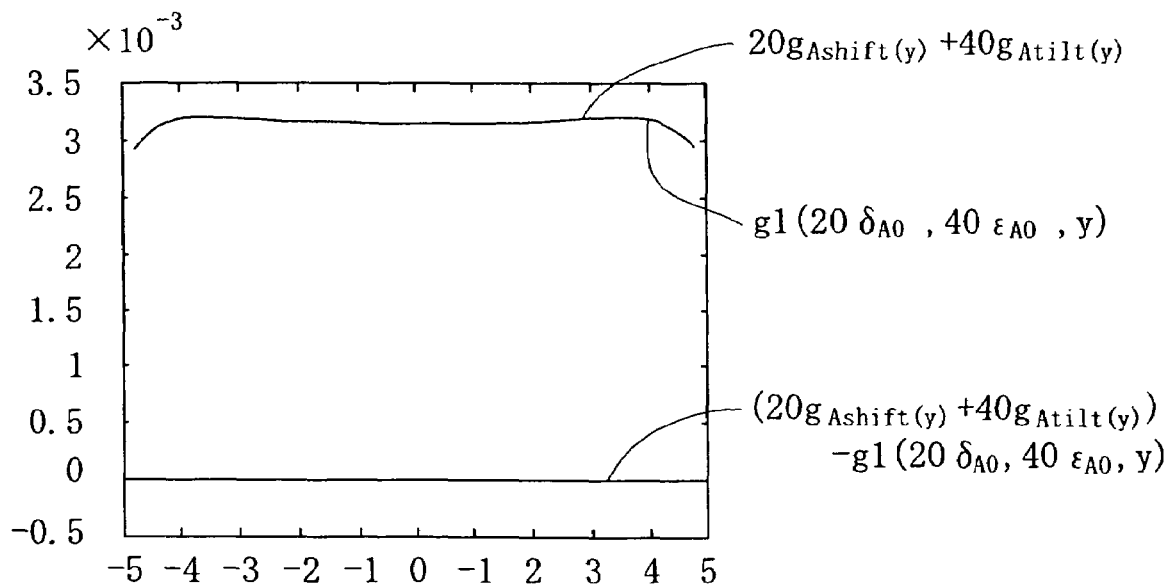
FIG. 15 is a graph showing a comparison between the inclination angle change function obeying Equation (3) where the eccentricities of the aspherical surface with a shift of 20 μm and a tilt of 4 minutes, shown in the third row of Table 2, are produced simultaneously and the inclination angle change function obeying Equation (6) expressed by the sum of the inclination angle shift change function and the inclination angle tilt change function, shown in FIG. 14 and multiplied by 20 and 40, respectively.

The inclination angle shift change function $g_{A\,shift}$ (y) and the inclination angle tilt change function $g_{A\,tilt}$ (y) relative to the surface A to be examined in Nos. 1, 2, and 3 are shown in FIGS. 10, 12, and 14, respectively. In FIGS. 11, 13, and 15, the inclination angle change function g1 ($\delta_A$, $\epsilon_A$, y) according to Equation (3) and the inclination angle change function g2 ($\delta_A$, $\epsilon_A$, y)=$\alpha g_{A\,shift}$ (y)+$\beta g_{A\,tilt}$ (y) according to Equation (6) in the surface A of Nos. 1-3 and the difference between these functions are shown.

From FIGS. 10-15, it is seen that Equation (6) is established in any case.

As mentioned above, it is seen that, even in Specific examples 1-3, the inclination angle change function with the amount of eccentricity ($\delta_A$, $\epsilon_A$) of the surface A to be examined obeys Equation (6).

The apparatus for measuring the eccentricity of the aspherical surface in each of the first and second embodiments, instead of finding the change of the inclination angle, detects the spot position of the rays Q1i'. Reference is made to this respect.

The data of the condenser lens 13, the collimator lens 15, the imaging lens 16, and the surface A to be examined are previously known. Thus, when the amount of spot shift that is a difference between the spot position P1i where the surface A is free of eccentricity and the spot position P1mi where eccentricity is caused is designated by ΔP1i (i=1, 2, . . . , N), a relation shown in Equation (9) described below can be established between the amount of spot shift ΔP1i and the inclination angle change function g1 ($\delta$, $\epsilon$, y).

$$g1(\delta,\epsilon,y)=h(\Delta P1i,\theta 1i) \quad (9)$$

The y coordinate y1i of the surface A, as shown in Equation (10) described below, is given as a function of the incident angle $\theta 1i$ of each ray Q1i.

$$y1i=y1i(\theta 1i)(i=1, 2, \ldots, N) \quad (10)$$

After all, in the apparatus for measuring the eccentricity of the aspherical surface of each of the first and second embodiments, Equation (9) is used and thereby the inclination angle change function of the surface A to be examined can be optically found. Consequently, by analyzing Equations (6) and (7) through the arithmetical unit 4, it becomes possible to calculate the amount of eccentricity ($\delta_A$, $\epsilon_A$) of the surface A.

Hence, in the apparatus for measuring the eccentricity of the aspherical surface of each of the first and second embodiments, Equation (9) is used and thereby the inclination angle change function of the surface A can be found. Consequently, by analyzing Equations (6) and (7) through the arithmetical unit 4, the amount of eccentricity ($\delta_A$, $\epsilon_A$) of the surface A can be calculated.

In the description of the eccentricity measurement using the apparatus for measuring the eccentricity of the aspherical surface in each of the first to fourth embodiments, the amount of eccentricity ($\delta_A$, $\epsilon_A$) of the surface A of the aspherical lens TL is found relative to the optical axis AX. Similarly, for the surface B of the aspherical surface TL, the amount of eccentricity ($\delta_B$, $\epsilon_B$) can be found relative to the optical axis AX. When the amount of eccentricity ($\delta_B$, $\epsilon_B$ is found, the relative face-to-face eccentricity ($\delta_A$-$\delta_B$, $\epsilon_A$-$\epsilon_B$) between the surfaces A and B to be examined, of the aspherical lens TL can be found. In this case, when the difference of the amount of eccentricity between the surfaces A and B of the aspherical lens TL is made, errors caused by the holding means 3 holding the aspherical lens TL, the position of the aspherical lens TL held by the holding means 3, and the reference base 5 are canceled.

Thus, when the apparatus and method for measuring the eccentricity of the aspherical surface in each of the first and second embodiments are used, there is no need to make severe setting of the holding means 3 holding the aspherical lens TL, and it becomes possible to find the face-to-face eccentricity of the aspherical lens TL by only deriving the inclination angle distribution from the amounts of spot movement of rays obtained by the light-detecting elements 17 and 27.

When the apparatus and method for measuring the eccentricity of the aspherical surface in each of the third and fourth embodiments are used, there is no need to make severe setting of the holding means 3 holding the aspherical lens TL, and it becomes possible to find the face-to-face eccentricity of the aspherical lens TL by only deriving the inclination angle distribution obtained by the detecting means 1' and 2'.

In the case where one of the surfaces to be examined is not aspherical, it is only necessary that, for the surface to be examined that is not aspherical, the amount of eccentricity is measured by a well-known method of measuring the eccentricity, while, for the aspherical surface, the amount of eccentricity is measured by the method for measuring the eccentricity of the aspherical surface in the present invention. In this case, the aspherical surface can be more simply derived than in the conventional method. Since the face-to-face eccentricity is such as to make the difference of the amount of eccentricity between both surfaces, errors caused by the holding means and the like, which is contained in the amount of eccentricity of the surface to be examined that is not aspherical, measured by the well-known method of measuring the eccentricity is canceled by errors caused by the holding means and the like, which is contained in the amount of eccentricity of the aspherical surface, measured by the method for measuring the eccentricity of the aspherical surface in the present invention. Consequently, the severe setting of the holding means is not necessary.

Embodiment 1

Figure 16:
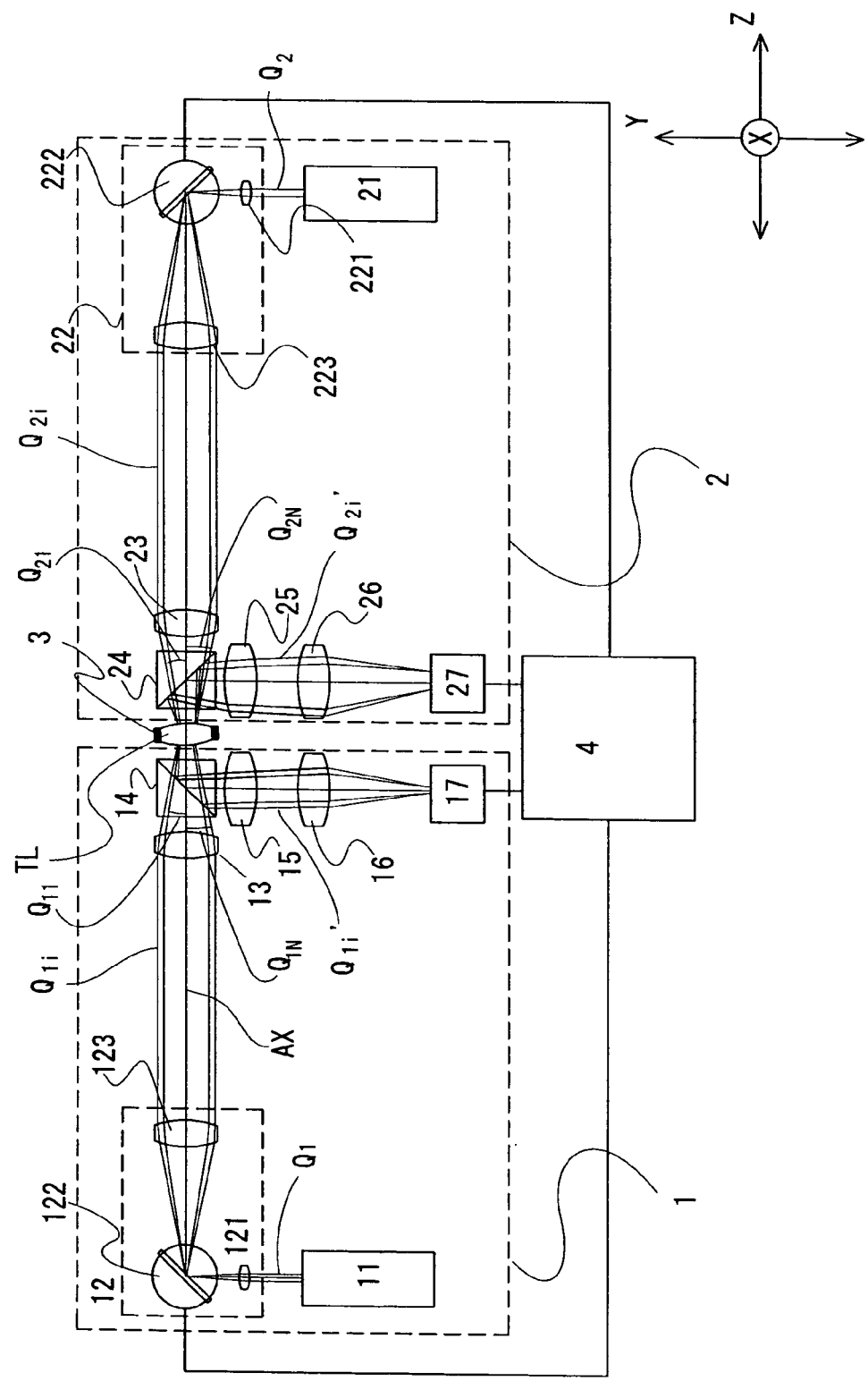
FIG. 16 is a view showing schematically the apparatus for measuring the eccentricity of the aspherical surface in Embodiment 1 of the present invention.

FIG. 16 shows the apparatus for measuring the eccentricity of the aspherical surface in Embodiment 1 of the present invention.

The apparatus for measuring the eccentricity of the aspherical surface of Embodiment 1 comprises the first measuring section 1 measuring the eccentricity of the aspherical surface (the surface) A to be examined, the second measuring section measuring the aspherical surface (the surface) B to be examined, the holding means 3 holding the aspherical lens TL, and the arithmetical unit 4.

The first measuring section 1 includes the first light source unit 11 that is an He—Ne laser producing the collimating light Q1; the first aspherical surface irradiating lens 13 with positive power, condensing the collimating light Q1 emitted from the first light source unit 11 in the proximity of the center FA of paraxial curvature of the aspherical surface A to be examined, of the aspherical lens TL; the first angle changing means 12 changing the collimating light Q1 emitted from the first light source unit 11 to the rays Q1i (i=1, 2, ..., N) that angles made with the optical axis AX of the first aspherical surface irradiating lens 13 where the rays Q1i are condensed through the first aspherical surface irradiating lens 13 are θ1i (i=1, 2, ..., N); the first reflecting means 14 that is a beam splitter reflecting the rays Q1i' (i=1, 2, ..., N) reflected by the surface A of the aspherical lens TL; the first collimator lens 15 converting the rays Q1i' (i=1, 2, ..., N) into nearly parallel light; the first imaging lens 16 condensing the rays Q1i' (i=1, 2, ..., N); and the first light-detecting means 17 that is a CCD detecting the spot position of the rays Q1i' (i=1, 2, ..., N).

The second measuring section 2 includes the second light source unit 21 that is an He—Ne laser producing the collimating light Q2; the second aspherical surface irradiating lens 23 with positive power, condensing the collimating light Q2 emitted from the second light source unit 21 in the proximity of the center FB of paraxial curvature of the aspherical surface B to be examined, of the aspherical lens TL; the second angle changing means 22 changing the collimating light Q2 emitted from the second light source unit 21 to the rays Q2i (i=1, 2, ..., N) that angles made with the optical axis AX of the second aspherical surface irradiating lens 23 where the rays Q2i are condensed through the second aspherical surface irradiating lens 23 are θ2i (i=1, 2, ..., N); the second reflecting means 24 that is a beam splitter reflecting the rays Q2i' (i=1, 2, ..., N) reflected by the surface B of the aspherical lens TL; the second collimator lens 25 converting the rays Q2i' (i=1, 2, ..., N) into nearly parallel light; the second imaging lens 26 condensing the rays Q2i' (i=1, 2, ..., N); and the second light-detecting means 27 that is a CCD detecting the spot position of the rays Q2i' (i=1, 2, ..., N).

The arithmetical unit 4 is designed to calculate the amount of eccentricity of the aspherical surface A by using Equations (4)-(10) for analysis in accordance with the spot positions of the rays Q1i' (i=1, 2, ..., N) and Q2i' (i=1, 2, ..., N), detected by the first and second detecting means 17 and 27.

The first angle changing means 12 has a first condenser lens 121, a first collimator lens 123, a first mirror unit 122 provided with the center of rotation in the proximity of the back focal plane of the first condenser lens 121 and the front focal plane of the first collimator lens 123, and a control device, not shown, and retains the function of feeding the information of the rotation angle of the first mirror unit 122 into the arithmetical unit 4.

The arithmetical unit 4 is such as to calculate a distance from the optical axis AX to each of the rays Q1i (i=1, 2, ..., N) that are parallel to the optical axis AX between the first collimator lens 123 and the first aspherical lens irradiating lens 13 and an angle θ1i (i=1, 2, ..., N) made by each ray with the optical axis AX of the first aspherical surface irradiating lens 13 where the rays are condensed through the first aspherical surface irradiating lens 13, from the information of the rotation angle of the first mirror unit 122 supplied from the first angle changing means 12, and to finally find the coordinates y1i (i=1, 2, ..., N) where the rays are incident on the aspherical surface A to be examined. Additionally, in the arithmetical unit 4, the coordinates y1i (i=1, 2, ..., N) of the aspherical surface A and the spot position P1mi (i=1, 2, ..., N) obtained by the detecting means 17 are used and the amount of eccentricity of the aspherical surface A is derived from Equations (4)-(10).

The second angle changing means 22, like the first angle changing means 12, has a second condenser lens 221, a second collimator lens 223, a second mirror unit 222 provided with the center of rotation in the proximity of the back focal plane of the second condenser lens 221 and the front focal plane of the second collimator lens 223, and a control device, not shown, and retains the function of feeding the information of the rotation angle of the second mirror unit 222 into the arithmetical unit 4.

The arithmetical unit 4 is such as to calculate a distance from the optical axis AX to each of the rays Q2i (i=1, 2, ..., N) that are parallel to the optical axis AX between the second collimator lens 223 and the second aspherical lens irradiating lens 23 and an angle θ2i (i=1, 2, ..., N) made by each ray with the optical axis AX of the second aspherical surface irradiating lens 23 where the rays are condensed through the second aspherical surface irradiating lens 23, from the information of the rotation angle of the second mirror unit 222 supplied from the second angle changing means 22, and to finally find the coordinates y2i (i=1, 2, ..., N) where the rays are incident on the aspherical surface B to be examined. Additionally, in the arithmetical unit 4, the coordinates y2i (i=1, 2, ..., N) of the aspherical surface B and the spot position P2mi (i=1, 2, ..., N) obtained by the detecting means 27 are used and the amount of eccentricity of the aspherical surface B is derived from Equations (4)-(10).

Further, in the arithmetical unit 4, the relative face-to-face eccentricity between the spherical surfaces A and B of the aspherical lens TL is calculated from the difference between the amounts of eccentricity of the aspherical surfaces A and B.

Embodiment 2

Figure 17:
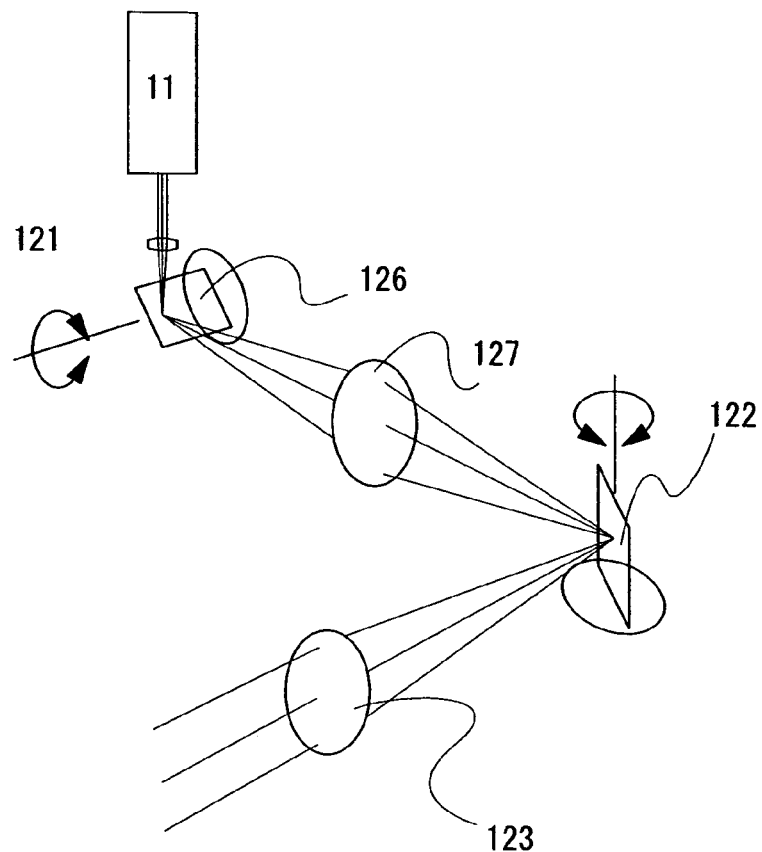
FIG. 17 is an explanatory view showing schematically an angle changing means used in the apparatus for measuring the eccentricity of the aspherical surface according to Embodiment 2 of the present invention.

FIG. 17 shows the angle changing means used in the apparatus for measuring the eccentricity of the aspherical surface according to Embodiment 2 of the present invention. Also, the apparatus for measuring the eccentricity of the aspherical surface of Embodiment 2 has the same structure as that of Embodiment 1 with exception of the angle changing means, and thus is omitted from the figure.

In the apparatus for measuring the eccentricity of the aspherical surface of Embodiment 2, the first angle changing means 12 is constructed so that two first mirror units 126 and 122 have directions of rotation at right angles with each other and the rays Q1i (i=1, 2, ..., N) can be scanned in a two-dimensional direction.

Specifically, the angle θ1i (i=1, 2, ..., N) made with the optical axis AX of the first aspherical surface irradiating lens 13 where the rays are condensed through the first aspherical surface irradiating lens 13 is changed in one of the directions of x and y axes by rotating the mirror unit 126 and in the other direction by rotating the mirror unit 122.

According to the apparatus for measuring the eccentricity of the aspherical surface of Embodiment 2, therefore, the eccentricity measurement can be made in an arbitrary direction of the aspherical surface A.

Other features of the function and effect are essentially the same as in the Embodiments.

The second angle changing means 22, like the first angle changing means 12, may be constructed so that two mirror units have directions of rotation at right angles with each other and the rays Q2i (i=1, 2, ..., N) can be scanned in a two-dimensional direction.

Embodiment 3

Figure 18:
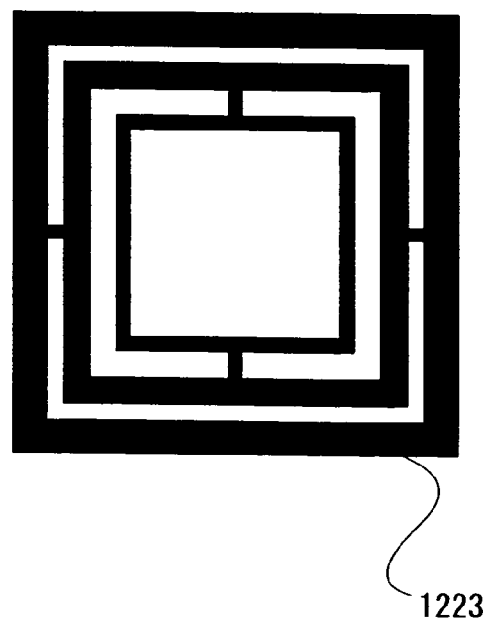
FIG. 18 is a plan view showing a mirror unit used in the angle changing means of the apparatus for measuring the eccentricity of the aspherical surface according to Embodiment 3 of the present invention.

FIG. 18 shows a mirror unit used in the angle changing means of the apparatus for measuring the eccentricity of the aspherical surface according to Embodiment 3 of the present invention. Also, the apparatus for measuring the eccentricity of the aspherical surface of Embodiment 3 has the same structure as that of Embodiment 1 with exception of the mirror unit, and thus is omitted from the figure.

In the apparatus for measuring the eccentricity of the aspherical surface of Embodiment 3, a mirror unit 1223 of the first angle changing means 12 is constructed so that a two-dimensional scan means, such as MEMS, is used and the rays Q1i (i=1, 2, ..., N) can be scanned in a two-dimensional direction.

According to the apparatus for measuring the eccentricity of the aspherical surface, the eccentricity measurement can be made in an arbitrary direction of the aspherical surface A with a smaller number of members than in Embodiment 2.

The mirror unit of the second angle changing means 22, like that of the first angle changing means 12, may be constructed so that a two-dimensional scan means, such as MEMS, is used and the rays Q2i (i=1, 2, ..., N) can be scanned in a two-dimensional direction.

Figure 20:
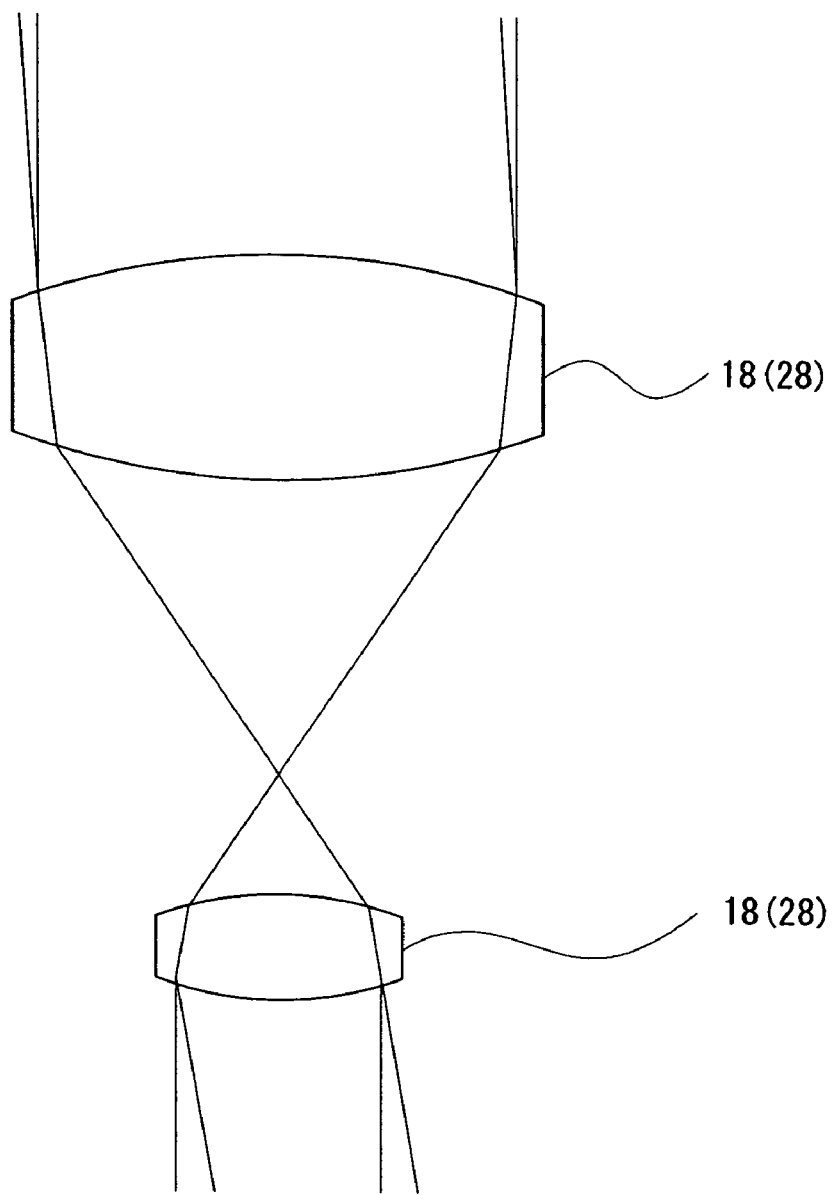
FIG. 20 is a view showing the case where the angular change of light rays is enlarged by the angular magnification of afocal lenses.

Afocal lenses 18, such as those shown in FIG. 20, may be interposed between the first collimator lens 15 and the first imaging lens 16 in FIG. 16. By doing so, the angular change, due to the eccentricity, of the rays Q1i' emerging from the first collimator lens can be enlarged. That is, the amount of spot shift ΔP1i of each of the rays Q1i' due to minute eccentricity can be increased and thus the improvement of measurement resolution is brought about. Likewise, when the afocal lenses are interposed between the second collimator lens 25 and the second imaging lens 26 in FIG. 16, the effect of the improvement of measurement resolution is obtained.

Embodiment 4

Figure 19:
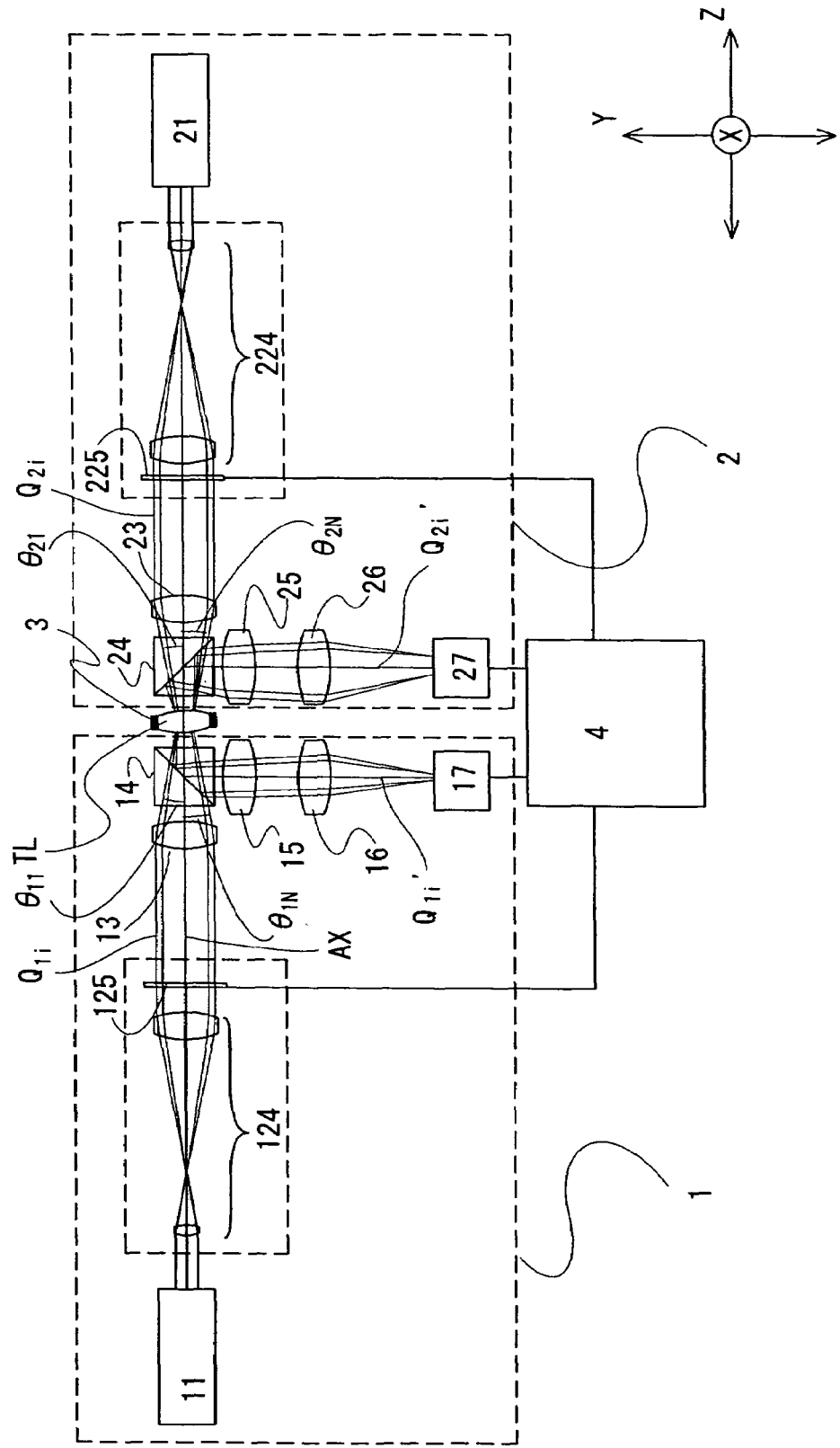
FIG. 19 is a view showing schematically the apparatus for measuring the eccentricity of the aspherical surface in Embodiment 4 of the present invention.

FIG. 19 shows the apparatus for measuring the eccentricity of the aspherical surface according to Embodiment 4 of the present invention.

In the apparatus for measuring the eccentricity of the aspherical surface of Embodiment 4, the first angle changing means 12 has a first beam expander 124 and a first aperture unit 125 in which an aperture position can be controlled.

The aperture of the first aperture unit 125 produces the rays Q1i (i=1, 2, ..., N) by transmitting a part of a parallel beam expanded by the first beam expander 124 and has almost the same function as the angle changing means in each of Embodiments 1-3.

Other features of the structure, function, and effect are essentially the same as in Embodiment 1.

The second angle changing means 22, like the first angle changing means 12, may have the beam expander and the aperture unit in which the aperture position can be controlled.

According to the present invention, as mentioned above, the apparatus and method for measuring eccentricity of the aspherical surface which do away with the need for the holding tool of the aspherical lens and the complicated and severe adjustment of the aspherical surface can be achieved.

What is claimed is:

1. An apparatus for measuring eccentricity of an aspherical surface in which an amount of eccentricity of an aspherical lens is measured, the apparatus comprising:
    a first light source unit;
    a first condenser lens for condensing light rays emitted from the first light source unit in a proximity of a center of paraxial curvature of a first surface to be examined, of the aspherical lens;
    a first angle changing means for entering the light rays on the first surface, at angles θ1i (i=1, 2, ..., N) with an optical axis;
    a holding tool for holding the aspherical lens;
    a first light-splitting element interposed between the first angle changing means and the holding tool;
    a first imaging lens for collecting light reflected by the first light-splitting element;
    a first light-detecting element for detecting a situation of light collected by the first imaging lens; and
    an arithmetical unit, the arithmetical unit including the processes of:
        storing spot positions P1mi(i=1, 2, ..., N) derived from the first light-detecting element with respect to light rays Q1i(i=1, 2, ..., N) produced by the first angle changing means;
        calculating spot positions P1i(i=1, 2, ..., N) relative to the light rays Q1i(i=1, 2, ..., N) on the basis of design data of the first surface; and
        calculating the amount of eccentricity of the first surface from amounts of shift ΔP1i(i=1, 2, ..., N) between the spot positions P1i(i=1, 2, ..., N) and the spot positions P1mi(i=1, 2, ..., N).

2. An apparatus for measuring eccentricity of an aspherical surface according to claim 1, further comprising:
    a second light source unit placed on an opposite side of the first light source unit, with the holding tool being arranged between the first light source unit and the second light source unit;
    a second condenser lens placed on the optical axis, for condensing light rays emitted from the second light source unit in the proximity of a center of paraxial curvature of a second surface to be examined, which is situated on an opposite side of the first surface;
    a second angle changing means for entering the light rays emitted from the second light source unit on the second surface at angles θ2i(i=1, 2, ..., N) with the optical axis;
    a second light-splitting element interposed between the second angle changing means and the holding tool;
    a second imaging lens for collecting light reflected by the second light-splitting element; and
    a second light-detecting element for detecting a situation of light collected by the second imaging lens,
    wherein the arithmetical unit includes the processes of:
        storing spot positions P2mi(i=1, 2, ..., N) derived from the second light-detecting element with respect to light rays Q2i(i=1, 2, ..., N) produced by the second angle changing means;
        calculating spot positions P2i(i=1, 2, ..., N) relative to the light rays Q2i(i=1, 2, ..., N) on the basis of design data of the second surface;
        calculating an amount of eccentricity of the second surface from amounts of shift ΔP2i(i=1, 2, ..., N)

between the spot positions P2i(i=1, 2, ..., N) and the spot positions P2mi(i=1, 2, ..., N); and calculating inter-surface eccentricity of the aspherical lens by using amounts of eccentricity of the first surface and the second surface.

3. A method for measuring eccentricity of an aspherical surface in which an amount of eccentricity of an aspherical lens is measured, the method comprising the steps of:

setting a unit shift $\delta_{A0}$ and a unit tilt $\epsilon_{A0}$ for expressing an amount of eccentricity of a first surface to be examined of the aspherical lens with a shift component and a tilt component, considering design data of the first surface;

calculating an inclination angle shift change function $g_{A\ shift}(y)$ of the first surface, on the basis of the design data of the first surface;

calculating an inclination angle tilt change function $g_{A\ shift}(y)$ of the first surface, on the basis of the design data of the first surface;

actually measuring an inclination angle distribution of tangents to the first surface;

performing fitting of the inclination angle distribution of tangents to the first surface, which has been actually measured, to a function expressed by $\alpha g_{A\ shift}(y) + \beta g_{A\ tilt}(y)$; and calculating an amount of shift $\delta_A$ and an amount of tilt $\epsilon_A$, which compose the amount of eccentricity of the first surface, from $\alpha$ and $\beta$, values of which have been determined by the previous step of fitting, and the unit shift $\alpha_{A0}$ and the unit tilt $\epsilon_{A0}$, on a basis of a relationship $(\delta_A, \epsilon_A)=(\alpha\delta_{A0}, \beta\epsilon_{A0})$, where the inclination angle shift change function $g_{A\ shift}(y)$ is a function introduced from a difference in inclination angle distribution of tangents to the first surface, between a supposed state where the first surface is displaced in parallel from an ideal noneccentric position by an amount of the unit shift $\delta_{A0}$ and a supposed state where the first surface is in the ideal noneccentric position, the inclination angle tilt change function $g_{A\ tilt}(y)$ is a function introduced from a difference in inclination angle distribution of tangents to the first surface, between a supposed state where the first surface is rotationally displaced from the ideal noneccentric position by an amount of the unit tilt $\epsilon_{A0}$ and the supposed state where the first surface is in the ideal noneccentric position.

4. A method for measuring eccentricity of an aspherical surface according to claim 3, further comprising a procedure for measuring an eccentricity of a second surface to be examined of the aspherical lens, the second surface being situated on an opposite side of the first surface, the procedure comprising the steps of:

setting a unit shift $\delta_{B0}$ and a unit tilt $\epsilon_{B0}$ for expressing an amount of eccentricity of the second surface with a shift component and a tilt component, considering design data of the second surface;

calculating an inclination angle shift change function $g_{B\ shift}(y)$ of the second surface, on the basis of design data of the second surface;

calculating an inclination angle tilt change function $g_{B\ tilt}(y)$ of the second surface, on the basis of the design data of the second surface;

actually measuring an inclination angle distribution of tangents to the second surface;

performing fitting of the inclination angle distribution of tangents to the second surface, which has been actually measured, to a function expressed by $\alpha' g_{B\ shift}(y) + \beta' g_{B\ tilt}(y)$;

calculating an amount of shift $\delta_B$ and an amount of tilt $\epsilon_B$, which compose the amount of eccentricity of the second surface, from $\alpha'$ and $\beta'$, values of which have been determined by the previous step of fitting, and the unit shift $\delta_{B0}$ and the unit tilt $\epsilon_{B0}$, on a basis of a relationship $(\delta_B, \epsilon_B)=(\alpha'\delta_{B0}, \beta'\epsilon_{B0})$; and calculating an inter-surface eccentricity $(\delta_A-\delta_B, \epsilon_A-\epsilon_B)$ of the aspherical lens from the amount of eccentricity of the first surface and the amount of eccentricity of the second surface, where the inclination angle shift change function $g_{B\ shift}(y)$ is a function introduced from a difference in inclination angle distribution of tangents to the second surface, between a supposed state where the second surface is displaced in parallel from an ideal noneccentric position by an amount of the unit shift $\delta_{B0}$ and a supposed state where the second surface is in the ideal noneccentric position, the inclination angle tilt change function $g_{B\ tilt}(y)$ is a function introduced from a difference in inclination angle distribution of tangents to the second surface, between a supposed state where the second surface is rotationally displaced from the ideal noneccentric position by an amount of the unit tilt $\epsilon_{B0}$ and the supposed state where the second surface is in the ideal noneccentric position.

5. An apparatus for measuring eccentricity of an aspherical surface according to claim 1, wherein the arithmetical unit preliminarily has, from the design data of the first surface:

an inclination angle shift change function $g_{A\ shift}(y)$ of the first surface, calculated from differences between the spot positions P1i(i=1, 2, ..., N) of light rays Q1i'(i=1, 2, ..., N) reflected from the first surface where the first surface is free of eccentricity and spot positions $P1_{A\ si}$(i=1, 2, ..., N) of the light rays Q1i'(i=1, 2, ..., N) where the first surface is positioned as displaced parallel with a direction perpendicular to the optical axis of the first condenser lens by an amount of a unit shift $\delta_{A0}$; and an inclination angle tilt change function $g_{A\ tilt}(y)$ of the first surface, calculated from differences between the spot positions P1i(i=1, 2, ..., N) of the light rays Q1i'(i=1, 2, ..., N) where the first surface is free of eccentricity and spot positions $P1_{A\ ti}$(i=1, 2, ..., N) of the light rays Q1i'(i=1, 2, ..., N) where the first surface positioned as rotationally displaced by an amount of a unit tilt $\epsilon_{A0}$ in a plane containing the optical axis of the first condenser lens, wherein an inclination angle distribution of the first surface, which is calculated from the amounts of shift $\Delta P1i$(i=1, 2, ..., N) of the spot positions of the light rays Q1i'(i=1, 2, ..., N) actually obtained by the light-detecting element, is expressed as a function $g1(\delta_A, \epsilon_A, y)=\alpha g_{A\ shift}(y)+\beta g_{A\ tilt}(y)$ in which the inclination angle shift change function $g_{A\ shift}(y)$ and the inclination angle tilt change function $g_{A\ tilt}(y)$, each of which is multiplied by a coefficient, are added and linearly combined so that amounts of shift and tilt $(\epsilon_A, \epsilon_A)=(\alpha\delta_{A0}, \beta\epsilon_{A0})$ of the first surface are determined from the coefficients $\alpha$ and $\beta$.

6. An apparatus for measuring eccentricity of an aspherical surface according to claim 2, wherein the arithmetical unit preliminarily has, from the design data of the first surface and the second surface:

an inclination angle shift change function $g_{A\ shift}(y)$ of the first surface, calculated from differences between the spot positions P1i(i=1, 2, ..., N) of light rays Q1i'(i=1, 2, ..., N) reflected from the first surface where the first surface is free of eccentricity and spot positions $P1_{A\ si}$(i=1, 2, ..., N) of the light rays Q1i'(i=1, 2, ..., N) where the first surface is positioned as displaced parallel with a direction perpendicular to the optical axis of the first condenser lens by an amount of a unit shift $\delta_{A0}$;

an inclination angle tilt change function $g_{A\ tilt}(y)$ of the first surface, calculated from differences between the spot positions P1i(i=1, 2, ..., N) of the light rays Q1i'(i=1, 2, ..., N) where the first surface is free of eccentricity and spot positions $P1_{A\ ti}$(i=1, 2, ..., N) of the light rays Q1i'(i=1, 2, ..., N) where the first surface is positioned as rotationally displaced by an amount of a unit tilt $\epsilon_{A0}$ in a plane containing the optical axis of the first condenser lens;

an inclination angle shift change function $g_{B\ shift}(y)$ of the second surface, calculated from differences between the spot positions P2i(i=1, 2, ..., N) of light rays Q2i'(i=1, 2, ..., N) reflected from the second surface where the second surface is free of eccentricity and spot positions $P2_{B\ si}$(=1, 2, ..., N) of the light rays Q2i'(i=1, 2, ..., N) where the second surface is positioned as displaced parallel with a direction perpendicular to the optical axis of the second condenser lens by an amount of a unit shift $\delta_{B0}$; and an inclination angle tilt change function $g_{B\ tilt}(y)$ of the second surface, calculated from differences between the spot positions P2i(i=1, 2, ..., N) of the light rays Q2i'(i=1, 2, ..., N) where the second surface is free of eccentricity and spot positions $P2_{B\ ti}$(i=1, 2, ..., N) of the light rays Q2i'(i=1, 2, ..., N) where the second surface is positioned as rotationally displaced by an amount of a unit tilt $\epsilon_{B0}$ in a plane containing the optical axis of the second condenser lens, wherein an inclination angle distribution of the first surface, which is calculated from the amounts of shift ΔP1i(i=1, 2, ..., N) of the spot positions of the light rays Q1i'(i=1, 2, ..., N) actually obtained by the light-detecting element, is expressed as a function $g1(\delta_A, \epsilon_A, y) = \alpha g_{A\ shift}(y) + \beta g_{A\ tilt}(y)$ in which the inclination angle shift change function $g_{A\ shift}(y)$ and the inclination angle tilt change function $g_{A\ tilt}(y)$, each of which is multiplied by a coefficient, are added and linearly combined so that amounts of shift and tilt $(\delta_A, \epsilon_A) = (\alpha\delta_{A0})$ of the first surface are determined from the coefficients α and β, and wherein an inclination angle distribution of the second surface, which is calculated from the amounts of shift ΔP2i(i=1,2,..., N) of the spot positions of the light rays Q2i'(i=1, 2, ..., N) actually obtained by the second light-detecting elements, is expressed as a function $g1(\delta_B, \epsilon_B, y) = \alpha' g_{B\ shift}(y) + \beta' g_{B\ tilt}(y)$ in which the inclination angle shift change function $g_{B\ shift}(y)$ and the inclination angle tilt change function $g_{B\ tilt}(y)$, each of which is multiplied by a coefficient, are added and linearly combined so that amounts of shift and tilt $(\delta_B, \delta_B) = (\alpha'\delta_{B0}, \beta'\epsilon_{B0})$ of the second surface are determined from the coefficients α' and β', and so that a relative inter-surface eccentricity $(\delta_A-\delta_B, \epsilon_A-\epsilon_B)$ between the first surface and the second surface is calculated.

7. An apparatus for measuring eccentricity of an aspherical surface according to claim 1, wherein the first angle changing means includes a third condenser lens for condensing light rays emitted from the first light source unit, a first variable reflecting angle element in which reflecting angles of the light rays can be changed by rotation, and a first collimator lens for making the light rays reflected by the first variable reflecting angle element parallel to the optical axis, and wherein the first variable reflecting angle element is placed so that a center of rotation is located in the proximity of a back focal plane of the third condenser lens and a front focal plane of the first collimator lens that coincide with each other and the light rays Q1i(i=1, 2, ..., N) are produced by rotation of the first variable reflecting angle element.

8. An apparatus for measuring eccentricity of an aspherical surface according to claim 2, wherein the first angle changing means includes a third condenser lens for condensing light rays emitted from the first light source unit, a first variable reflecting angle element in which reflecting angles of the light rays can be changed by rotation, and a first collimator lens for making the light rays reflected by the first variable reflecting angle element parallel to the optical axis, and the first variable reflecting angle element is placed so that a center of rotation is located in the proximity of a back focal plane of the first condenser lens and a front focal plane of the first collimator lens that coincide with each other and the light rays Q1i(i=1, 2, ..., N) are produced by rotation of the first variable reflecting angle element, and wherein the second angle changing means includes a fourth condenser lens for condensing light rays emitted from the second light source unit, a second variable reflecting angle element in which reflecting angles of the light rays emitted from the second light source unit can be changed by rotation, and a second collimator lens for making the light rays reflected by the second variable reflecting angle element parallel to the optical axis, and the second variable reflecting angle element is placed so that a center of rotation is located in the proximity of a back focal plane of the fourth condenser lens and a front focal plane of the second collimator lens that coincide with each other and the light rays Q2i(i=1, 2, ..., N) are produced by rotation of the second variable reflecting angle element.

9. An apparatus for measuring eccentricity of an aspherical surface according to claim 7, wherein the first angle changing means has two variable reflecting angle elements arranged so that their reflection-angle changing directions make right angles with each other, and wherein the light rays emitted from the first light source unit scan two-dimensionally through the two variable reflecting angle elements.

10. An apparatus for measuring eccentricity of an aspherical surface according to claim 8, wherein each of the first angle changing means and the second angle changing means has two variable reflecting angle elements arranged so that their reflection-angle changing directions make right angles with each other, and wherein the light rays emitted from the first light source unit scan two-dimensionally through the two variable reflecting angle elements in the first angle changing means and the light rays emitted from the second light source unit scan two-dimensionally through the two variable reflecting angle elements in the second angle changing means.

11. An apparatus for measuring eccentricity of an aspherical surface according to claim 7,
wherein the first variable reflecting angle element is constructed so that the reflecting angle is adjustable two-dimensionally.

12. An apparatus for measuring eccentricity of an aspherical surface according to claim 8,
wherein each of the first variable reflecting angle element and the second variable reflecting angle element is constructed so that the reflecting angle is adjustable two-dimensionally.

13. An apparatus for measuring eccentricity of an aspherical surface according to claim 1,
wherein the first angle changing means includes a first beam expander for expanding a beam section of collimated light produced by the first light source unit and a first aperture element having a variable aperture position so that the first aperture element is moved in a plane perpendicular to the optical axis of the first beam expander and thereby the light rays Q1i(i=1, 2, ..., N) are produced.

14. An apparatus for measuring eccentricity of an aspherical surface according to claim 2,
wherein the first angle changing means includes a first beam expander for expanding a beam section of collimated light produced by the first light source unit and a first aperture element having a variable aperture position so that the first aperture element is moved in a plane perpendicular to the optical axis of the first beam expander and thereby the light rays Q1i(i=1, 2, ..., N) are produced, and
wherein the second angle changing means includes a second beam expander for expanding a beam section of collimated light produced by the second light source unit and a second aperture element having a variable aperture position so that the second aperture element is moved in a plane perpendicular to the optical axis of the second beam expander and thereby the light rays Q2i (i=1, 2, ..., N) are produced.

15. An apparatus for measuring eccentricity of an aspherical surface according to claim 7,
wherein first afocal lenses for increasing an angle magnification with respect to the light rays Q1i'(i=1, 2, ..., N) are interposed between the first collimator lens and the first imaging lens.

16. An apparatus for measuring eccentricity of an aspherical surface according to claim 8,
wherein first afocal lenses for increasing an angle magnification with respect to the light rays Q1i'(i=1, 2, ..., N) are interposed between the first collimator lens and the first imaging lens, and
wherein second afocal lenses for increasing an angle magnification with respect to the light rays Q2i'(i=1, 2, ..., N) are interposed between the second collimator lens and the second imaging lens.

* * * * *

UNITED STATES PATENT AND TRADEMARK OFFICE
CERTIFICATE OF CORRECTION

PATENT NO. : 7,286,212 B2  Page 1 of 1
APPLICATION NO. : 10/979165
DATED : October 23, 2007
INVENTOR(S) : Mitsuru Namiki It is certified that error appears in the above-identified patent and that said Letters Patent is hereby corrected as shown below:

Claim 3, line 12 (column 19, line 17), change "$g_{A\,shift}(y)$" to -- $g_{A\,tilt}(y)$ --.

Claim 5, lines 20-21 (column 20, lines 45-46), change "where the first surface positioned..." to -- where the first surface is positioned... --;

Claim 5, line 34 (column 20, line 59), change "$(\varepsilon_A, \varepsilon_A) = (\alpha\delta_{A0}, \beta\varepsilon_{A0})$" to -- $(\delta_A, \varepsilon_A) = (\alpha\delta_{A0}, \beta\varepsilon_{A0})$ --.

Claim 6, line 29 (column 21, line 22), change "$P2_{B\,si}(= 1, 2, ..., N)$" to -- $P2_{B\,si}(i = 1, 2, ..., N)$ --;

Claim 6, line 54 (column 21, line 47), change "$(\delta_A, \varepsilon_A) = (\alpha\delta_{A0})$" to -- $(\delta_A, \varepsilon_A) = (\alpha\delta_{A0}, \beta\varepsilon_{A0})$ --;

Claim 6, line 66 (column 21, line 59), change "$(\delta_B, \delta_B) = (\alpha'\delta_{B0}, \beta'\varepsilon_{B0})$" to -- $(\delta_B, \varepsilon_B) = (\alpha'\delta_{B0}, \beta'\varepsilon_{B0})$ --.

Signed and Sealed this

Seventh Day of October, 2008

JON W. DUDAS
*Director of the United States Patent and Trademark Office*